(12) United States Patent
Sarawate et al.

(10) Patent No.: US 11,047,248 B2
(45) Date of Patent: Jun. 29, 2021

(54) CURVED SEAL FOR ADJACENT GAS TURBINE COMPONENTS

(71) Applicant: General Electric Company, Schenectady, NY (US)

(72) Inventors: Neelesh Nandkumar Sarawate, Niskayuna, NY (US); Jonathan Dwight Berry, Simpsonville, SC (US); Russell Pierson DeForest, Simpsonville, SC (US); Kevin Weston McMahan, Greenville, SC (US); Victor John Morgan, Simpsonville, SC (US); Ibrahim Sezer, Greenville, SC (US); Deepak Trivedi, Halfmoon, NY (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 16/012,380

(22) Filed: Jun. 19, 2018

(65) Prior Publication Data
US 2019/0383156 A1 Dec. 19, 2019

(51) Int. Cl.
*F01D 11/00* (2006.01)
*F16J 15/08* (2006.01)
*F23R 3/46* (2006.01)

(52) U.S. Cl.
CPC ......... *F01D 11/005* (2013.01); *F16J 15/0887* (2013.01); *F23R 3/46* (2013.01);
(Continued)

(58) Field of Classification Search
CPC .............. F01D 11/005; F05D 2240/55; F23R 2900/00012; F23R 3/46; F16J 15/0887
See application file for complete search history.

(56) References Cited

U.S. PATENT DOCUMENTS 3,947,145 A * 3/1976 Michel .................. F01D 11/005
 415/209.4
4,063,845 A * 12/1977 Allen .................... F01D 11/005
 415/134
(Continued)

FOREIGN PATENT DOCUMENTS

| EP | 1096108 A2 | 5/2001 |
| EP | 2886800 A1 | 6/2015 |
| JP | S602202 A | 2/1985 |

OTHER PUBLICATIONS

Sarawate, Neelesh, et al., U.S. Appl. No. 15/862,520, entitled "Systems and Methods for Assembling Flow Path Components," filed Jan. 4, 2018.
(Continued)

*Primary Examiner* — Eugene G Byrd
(74) *Attorney, Agent, or Firm* — Dority & Manning, P.A.

(57) ABSTRACT

A flexible seal for sealing between two adjacent gas turbine components includes a forward end, an aft end axially separated from the forward end, and an intermediate portion between the forward end and the aft end. The intermediate portion defines a continuous curve in the circumferential direction, such that the aft end is circumferentially offset from the forward end. In other cases, the forward and aft ends are axially, radially, and circumferentially offset from one another. A method of sealing using the flexible seal includes inserting, in an axial direction, the aft end of the flexible seal into a recess defined by respective seal slots of two adjacent gas turbine components; and pushing the flexible seal in an axial direction through the recess until the forward end is disposed within the recess.

13 Claims, 15 Drawing Sheets

(52) U.S. Cl.
CPC ...... *F05D 2240/35* (2013.01); *F05D 2240/55* (2013.01); *F23R 2900/00012* (2013.01)

(56) References Cited

U.S. PATENT DOCUMENTS

| | | | |
|---|---|---|---|
| 6,527,274 B2 | 3/2003 | Herron et al. | |
| 6,561,764 B1 | 5/2003 | Tiemann | |
| 7,874,138 B2 | 1/2011 | Rubio et al. | |
| 8,398,090 B2* | 3/2013 | McMahan | F16J 15/061 |
| | | | 277/644 |
| 8,545,181 B2 | 10/2013 | Charlton | |
| 8,613,599 B2* | 12/2013 | Lake | F01D 11/006 |
| | | | 416/221 |
| 9,771,895 B2* | 9/2017 | Kramer | F02K 1/82 |
| 9,816,393 B2 | 11/2017 | Simon-Delgado et al. | |
| 9,879,555 B2 | 1/2018 | Moehrle et al. | |
| 9,890,651 B2* | 2/2018 | Heaven | F01D 11/00 |
| 9,909,439 B2* | 3/2018 | Bluck | F01D 5/147 |
| 10,378,378 B2* | 8/2019 | Watanabe | F01D 25/08 |
| 10,655,489 B2* | 5/2020 | Sarawate | F01D 11/005 |
| 2003/0039542 A1* | 2/2003 | Cromer | F01D 11/005 |
| | | | 415/135 |
| 2006/0239814 A1* | 10/2006 | Uwami | F01D 11/008 |
| | | | 415/134 |
| 2008/0260524 A1* | 10/2008 | Khanin | F01D 11/005 |
| | | | 415/177 |
| 2010/0178173 A1* | 7/2010 | Charlton | F01D 11/006 |
| | | | 416/248 |
| 2010/0300116 A1* | 12/2010 | Kaleeswaran | F16J 15/0887 |
| | | | 60/800 |
| 2012/0304657 A1* | 12/2012 | Melton | F23R 3/60 |
| | | | 60/752 |
| 2013/0028713 A1* | 1/2013 | Giri | F16J 15/064 |
| | | | 415/135 |
| 2014/0013762 A1* | 1/2014 | Takiguchi | F02C 7/18 |
| | | | 60/737 |
| 2016/0003079 A1* | 1/2016 | Boeke | F01D 11/005 |
| | | | 415/1 |
| 2016/0177762 A1* | 6/2016 | Sarawate | F01D 11/02 |
| | | | 60/805 |
| 2016/0281523 A1* | 9/2016 | Mathews | F16J 15/062 |
| 2017/0089211 A1* | 3/2017 | Broomer | F01D 11/005 |
| 2017/0198718 A1 | 7/2017 | Hiroyuki et al. | |
| 2017/0276357 A1 | 9/2017 | Berry et al. | |
| 2017/0276358 A1 | 9/2017 | Berry et al. | |
| 2017/0276359 A1 | 9/2017 | Berry et al. | |
| 2017/0276360 A1 | 9/2017 | Berry et al. | |
| 2017/0276361 A1 | 9/2017 | Berry et al. | |
| 2017/0276362 A1 | 9/2017 | Berry et al. | |
| 2017/0276363 A1 | 9/2017 | Berry et al. | |
| 2017/0276364 A1 | 9/2017 | Berry et al. | |
| 2017/0276365 A1 | 9/2017 | Berry et al. | |
| 2017/0276366 A1 | 9/2017 | Berry et al. | |
| 2017/0276369 A1 | 9/2017 | Berry et al. | |
| 2017/0298827 A1 | 10/2017 | Berry et al. | |
| 2017/0299185 A1 | 10/2017 | Berry et al. | |
| 2017/0299186 A1 | 10/2017 | Berry et al. | |
| 2017/0299187 A1 | 10/2017 | Berry et al. | |
| 2018/0037511 A1* | 2/2018 | Watanabe | F01D 11/00 |
| 2018/0347366 A1* | 12/2018 | Simonet | F01D 11/005 |
| 2018/0355741 A1* | 12/2018 | Groves, II | F01D 25/12 |
| 2019/0383488 A1* | 12/2019 | Berry | F01D 9/023 |

OTHER PUBLICATIONS

Huber, Thomas, et al., "Investigation of Strip Seal Leakage with Special Focus on Seal Groove Design and Relative Displacement of Sealing Surfaces," Proceedings of ASME Turbo Expo 2017: Turbomachinery Technical Conference, Charlotte, NC, Jun. 26-30, 2017, vol. 5B: Heat Transfer, Paper No. GT2017-64440 (8 pages), American Society of Mechanical Engineers, New York, NY.

European Search Report issued in connection with corresponding EP Application No. 19167788.9-1006 dated Aug. 10, 2019.

* cited by examiner

CURVED SEAL FOR ADJACENT GAS TURBINE COMPONENTS

STATEMENT REGARDING GOVERNMENT FUNDING

The subject matter of this disclosure was made with support from the United States government, under Contract Number DE-FE0023965, which was awarded by the U.S. Department of Energy. The government has certain rights in this invention.

TECHNICAL FIELD

The present disclosure relates generally to the field of gas turbines and, more particularly, to seals for integrated combustor nozzles that define separate combustion zones within an annular combustor and that accelerate the flow entering the turbine section. The continuously curved seals are configured to seal the inner and outer liner segments to facilitate installation and removal of both the seals and the integrated combustor nozzles from the annular combustor.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary nozzles disposed between the rotating blades, such that each set of rotating blades and each corresponding set of stationary nozzles defines a turbine stage. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

In recent years, efforts have been made to design can-annular combustion systems in which the first stage of turbine nozzles is integrated with the aft ends of the combustion cans. Such efforts have resulted in a so-called "transition nozzle" that accelerates and turns the flow as it enters the turbine section.

More recently, development efforts have applied the transition nozzle technology in an annular combustion system, leading to the creation of a segmented annular combustion system, as described in commonly assigned U.S. Patent Application Publication No. 2017/0276369. In a segmented annular combustion system, the inner liner shell and the outer liner shell are segmented circumferentially into individual modules, and an array of fuel injection panels extends between the inner liner shell segments and the outer liner shell segments of the annular combustor to create a set of units called "integrated combustor nozzles." A plurality of combustion zones is defined between adjacent pairs of integrated combustor nozzles within the annular combustor. The integrated combustor nozzles are shaped like airfoils without a leading edge, and the trailing edge (aft end) of each integrated combustor nozzle defines a turbine nozzle capable of turning and accelerating the flow of combustion gases into the turbine.

To optimize the performance of such a combustion system, it is necessary to seal between adjacent integrated combustor nozzles along the inner liner shell segment and the outer liner shell segment. Initial efforts to seal these components relied upon multiple straight seals that were installed circumferentially into seal slots along the circumferential edges of the liner shell segments. This installation method proved difficult, especially with small seal components, both in maintaining the position of the seal during installation of the subsequent integrated combustor nozzle and in preventing the seal from being crushed (or otherwise damaged) when the subsequent integrated combustor nozzle was installed. Moreover, if one of the seals slipped out of position during installation, the technician was faced with the difficult task of its retrieval from within the turbine.

Another issue with the prior sealing efforts is that, as the seals are installed end-to-end over the axial length of the integrated combustor nozzle, leakages arise between the axial segments of the seal. Such leakages reduce the amount of air flow usable for other purposes, such as cooling or combustion.

Finally, the dogleg shape of the integrated combustor nozzles and the prior sealing efforts made removal of a single integrated combustor nozzle difficult. Because multiple seals were installed end-to-end along the axial length of the integrated combustor nozzle, it was impossible to remove the seals axially. As a result, the integrated combustor nozzles had to be "fanned out" by forcibly shifting the integrated combustor nozzles in a circumferential direction, and the integrated combustor nozzle to be removed had to be wrestled out of its nested position within the array of integrated combustor nozzles.

SUMMARY

A flexible seal for sealing between two adjacent gas turbine components includes a forward end, an aft end axially separated from the forward end, and an intermediate portion between the forward end and the aft end. The intermediate portion defines a continuous curve in the circumferential direction, such that the aft end is circumferentially offset from the forward end. In other cases, the forward and aft ends are axially, radially, and circumferentially offset from one another. A method of sealing using the flexible seal includes inserting, in an axial direction, the aft end of the flexible seal into a recess defined by respective seal slots of two adjacent gas turbine components; and pushing the flexible seal in an axial direction through the recess until the forward end is disposed within the recess.

Specifically, according to one aspect of the present disclosure, a flexible seal for sealing between two adjacent gas turbine components is provided. The flexible seal includes a forward end, an aft end axially separated from the forward end, and an intermediate portion between the forward end and the aft end. The intermediate portion defines a continuous curve in the circumferential direction, such that the aft end is circumferentially offset from the forward end.

According to another aspect of the present disclosure, a flexible seal for sealing between two adjacent gas turbine components is provided. The flexible seal includes a seal body having a forward end and an aft end, wherein the aft end is axially, radially, and circumferentially offset from the forward end.

According to yet another aspect of the present disclosure, a method of sealing between two adjacent gas turbine components using a seal having a first end and an opposing second end is provided. The method includes: inserting, in an axial direction, the second end of the flexible seal into a recess defined by respective seal slots in each continuously curved circumferential sealing surface of the two adjacent gas turbine components, wherein the first end is axially, radially, and circumferentially offset from the second end; and pushing the flexible seal in an axial direction through the recess until the first end is disposed within the recess.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

Figure 1:
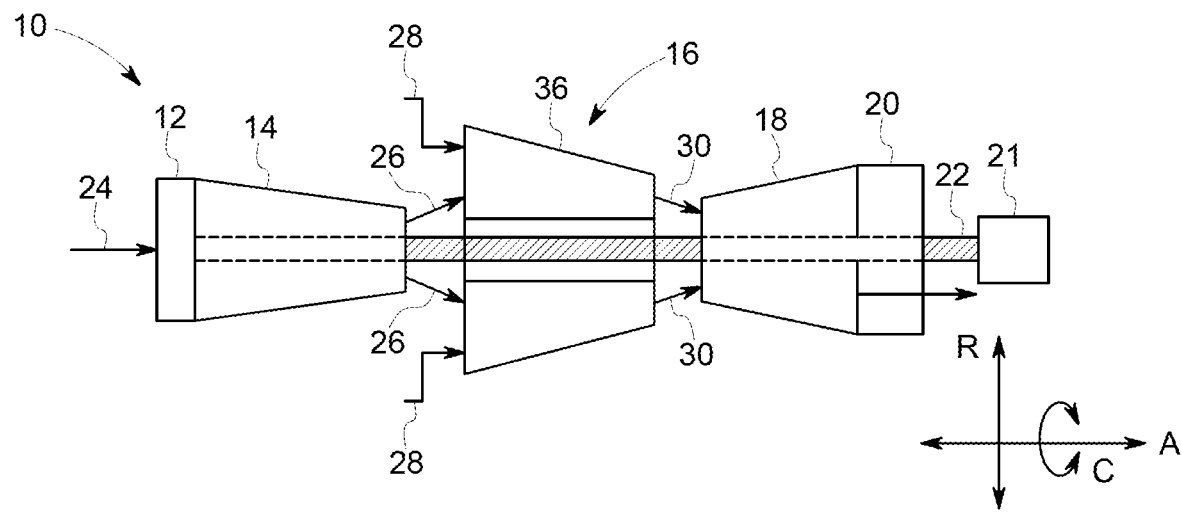
FIG. 1 is a functional block diagram of an exemplary gas turbine that may incorporate various embodiments of the present disclosure.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current integrated combustor nozzle, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The term "inner" is used to describe components in proximity to the turbine shaft, while the term "outer" is used to describe components distal to the turbine shaft.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a segmented annular combustion system for a land-based power-generating gas turbine for purposes of illustration, one of ordinary skill in the art will readily appreciate that embodiments of the present disclosure may be applied to any type of combustor for a turbomachine and are not limited to annular combustion systems for land-based power-generating gas turbines unless specifically recited in the claims.

Referring now to the drawings, FIG. 1 schematically illustrates an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 (also known as "rotors") that couple the compressor 14 to the turbine 18.

During operation, air 24 flows through the inlet section 12 and into the compressor 14, where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 to into the turbine 18, where thermal and/or kinetic energy are transferred from the combustion gases 30 to rotor blades (not shown) attached to the shaft 22, thereby causing the shaft 22 to rotate. The mechanical rotational energy may then be used for various purposes, such as to power the compressor 14 and/or to generate electricity, via a generator 21 coupled to the shaft 22. The combustion gases 30 exiting the turbine 18 may then be exhausted from the gas turbine 10, via the exhaust section 20.

Figure 2:
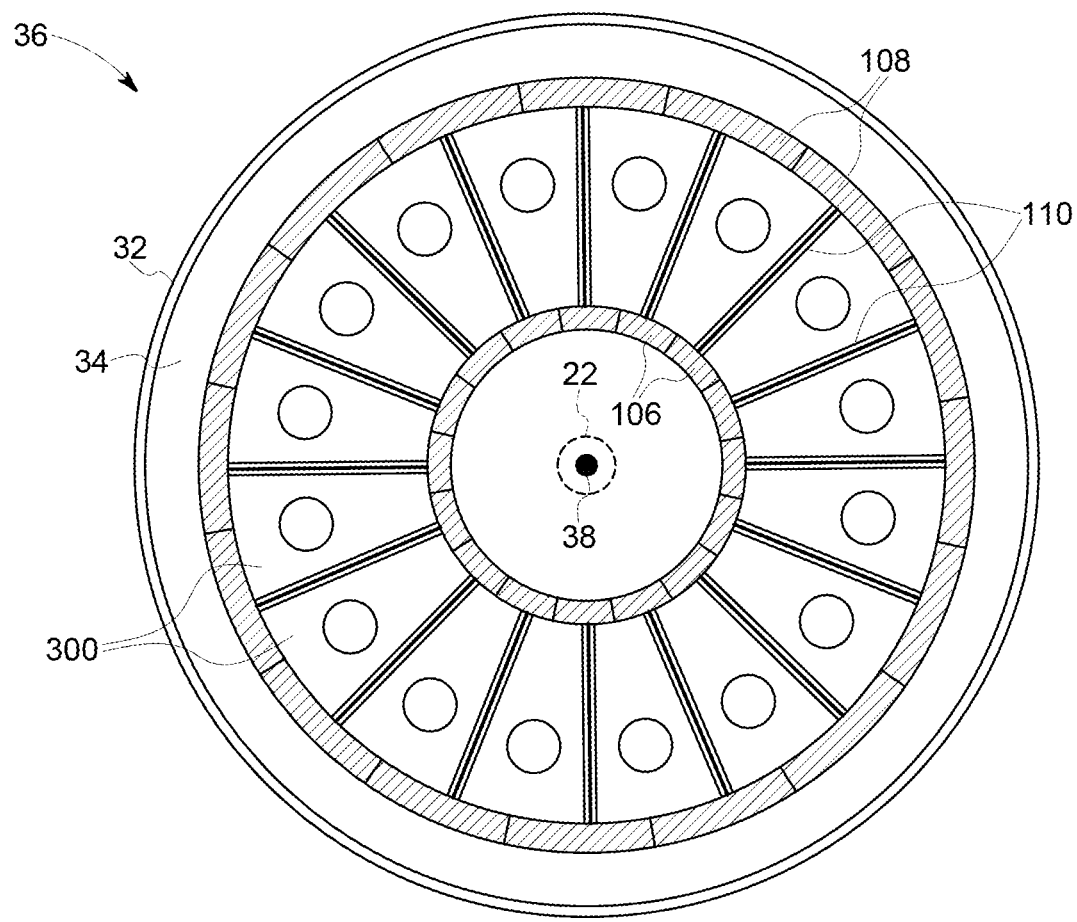
FIG. 2 is an upstream view of an exemplary segmented annular combustor, which may be used as the combustion section of the gas turbine of FIG. 1, according to at least one embodiment of the present disclosure.

FIG. 2 provides an upstream (i.e., an aft-looking-forward) view of the combustion section 16, according to various embodiments of the present disclosure. As shown in FIG. 2, the combustion section 16 may be an annular combustion system and, more specifically, a segmented annular combustor 36 in which an array of integrated combustor nozzles 100 are arranged circumferentially about an axial centerline 38 of the gas turbine 10. The axial centerline 38 may be coincident with the gas turbine shaft 22. The segmented annular combustion system 36 may be at least partially surrounded by an outer casing 32, sometimes referred to as a compressor discharge casing. The compressor discharge casing 32, which receives compressed air 26 from the compressor 14 (FIG. 1), may at least partially define a high-pressure air plenum 34 that at least partially surrounds various components of the combustor 36. The compressed air 26 is used for combustion, as described above, and for cooling combustor hardware.

The segmented annular combustor 36 includes a circumferential array of integrated combustor nozzles 100. Each integrated combustor nozzle 100 includes an inner liner segment 106, an outer liner segment 108 radially separated from the inner liner segment 106, and a hollow or semi-hollow panel 110 extending radially between the inner liner segment 106 and the outer liner segment 108, thus generally defining an "I"-shaped assembly. The panels 110 separate the combustion chamber into an annular array of fluidly separated combustion zones.

Figure 3:
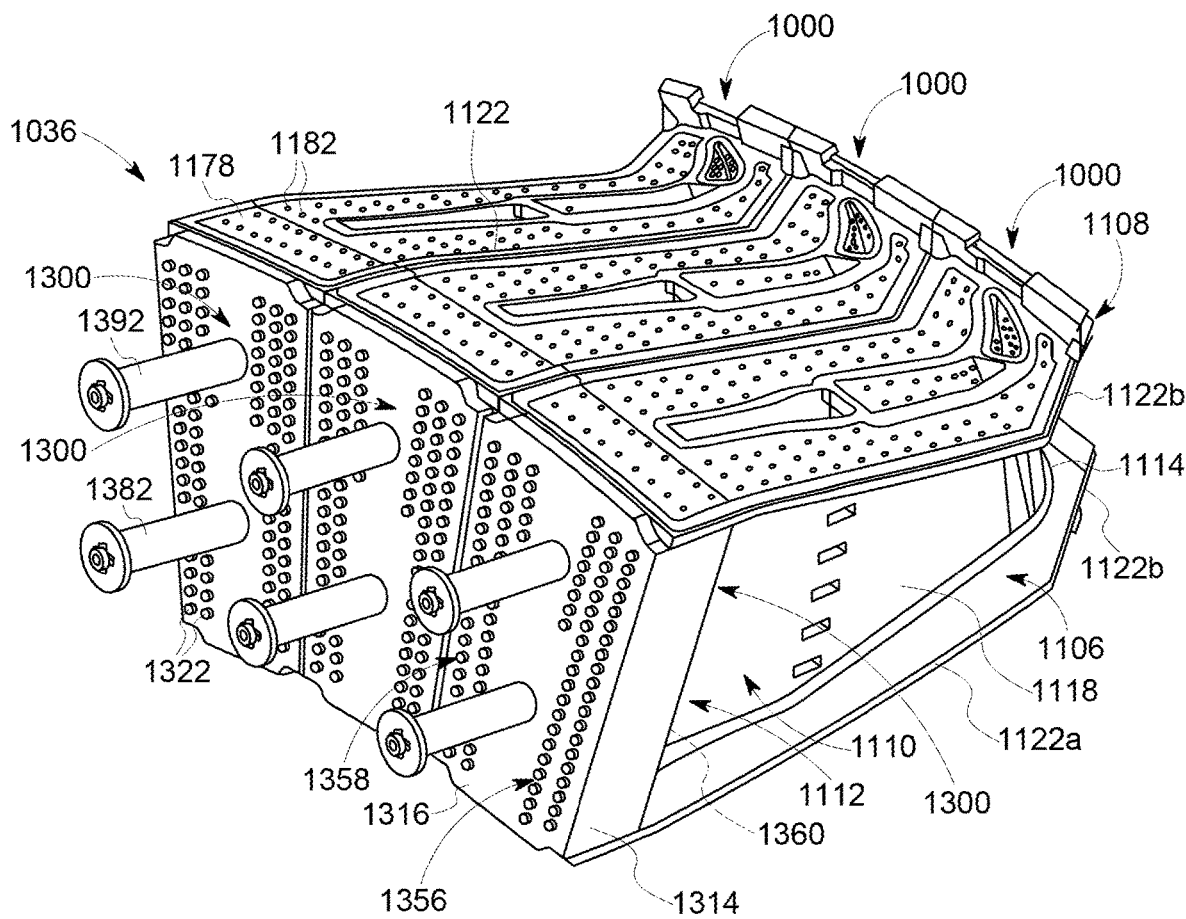
FIG. 3 is a downstream perspective view of three circumferentially adjacent integrated combustor nozzles (of the segmented annular combustor of FIG. 2) to which three fuel injection modules are mounted, according to a conventional design.

At the upstream end of the segmented annular combustor 36, a fuel injection module 300 extends circumferentially between each pair of the panels 110 and radially between the inner liner segment 106 and the outer liner segment 108. The fuel injection modules 300 introduce a fuel/air mixture into the combustion zones from a burner, a swirling fuel nozzle (swozzle), or a bundled tube fuel nozzle (e.g., as shown in FIG. 3). Each fuel injection module 300 has at least one fuel conduit supplying the fuel injection modules 300, which, for illustrative purposes, is represented by a circle. If desired for greater operational range (e.g., turn-down) and lower emissions, the panels 110 may also introduce fuel in one or more stages downstream of the combustion zones created by the injection of the fuel/air mixtures delivered by the fuel injection modules 300.

FIG. 3 illustrates a set of three respective integrated combustor nozzles 1000, which are assembled with three exemplary fuel injection modules 1300, according to conventional practice (for example, as described in commonly assigned U.S. Patent Application Publication No. 2017-027639). Each integrated combustor nozzle 1000 includes an inner liner segment 1106, an outer liner segment 1108, and a hollow or semi-hollow fuel injection panel 1110 that extends between the inner liner segment 1106 and the outer liner segment 1108. Each fuel injection panel 1110 includes a forward portion 1112 and an aft portion 1114. The aft portion 1114 defines the shape of a first-stage turbine nozzle in a conventional gas turbine. The forward portion 1112 and the aft portion 1114 are connected by a pair of side walls (one of which is shown as a suction-side wall 1118).

When all the integrated combustor nozzles 1000 are installed, the respective inner liner segments 1106 define an inner boundary of the combustion chamber, and the respective outer liner segments 1108 defined an outer boundary of the combustion chamber (as shown in FIG. 2).

In the exemplary embodiment shown in FIG. 3, the outer liner segments 1108 may be provided with impingement cooling panels 1178, which are radially spaced from the outer liner segments 1108 and which include a plurality of impingement holes 1182 that are in fluid communication with the gap between the outer liner segments 1108 and the respective impingement cooling panels 1178. The inner liner segments 1106 may be similarly cooled.

The segmented annular combustion system 1036 further includes a plurality of annularly arranged fuel injection modules 1300, each of which may extend circumferentially between two circumferentially adjacent fuel injection panels 1100 and/or at least partially radially between a respective inner liner segment 1106 and outer liner segment 1108. The fuel injection module 1300 may include a bundled tube fuel nozzle that includes a plurality of premixing tubes 1322 extending through one or more fuel plenums (not shown) defined between axially separated plates 1316, 1360. In the exemplary configuration of the conventional design, the plurality of premixing tubes 1322 of the fuel injection module 1300 may be arranged into a first subset of tubes 1356 and a second subset of tubes 1358. Fuel to the first subsets of tubes 1356 and the second subset of tubes 1358 may be supplied via fuel conduits 1382 and/or 1392.

Other arrangements may, of course, be used. Indeed, the bundled tube fuel nozzles may be replaced by any type of fuel nozzle or burner (such as a swirling fuel nozzle or swozzle).

The fuel injection panel 1110, which extends radially between the inner liner segment 1106 and the outer liner segment 1108, has a shape that curves in the circumferential direction from the forward end 1112 to the aft end 1114 to turn and accelerate the flow of combustion products 30 into the turbine section 18. Additionally, the fuel injection panel 1110 may include a difference in height in the radial direction, such that the forward end 1112 of the fuel injection panel 1110 has a greater height than the aft end 1114.

The inner and outer liner segments 1106, 1108 in the conventional design are configured with a dogleg shape to generally reflect the curved shape of the fuel injection panel 1110, and the adjacent sealing surfaces (e.g., 1122a, 1122b) of each liner segment 1106, 1108 are disposed at an oblique angle relative to one another. Such a configuration makes sealing along the joints 1122 between adjacent inner liner segments 1106 and between adjacent outer liner segments 1108 challenging.

In the conventional configuration shown in FIG. 3, the sealing surfaces 1122a, 1122b are provided with a C-shaped slot, or open channel, extending substantially along the length of the sealing surfaces 1122a, 1122b, and within which multiple straight seal components (not shown) are installed end-to-end to seal the joint 1122 between adjacent liner segments 1106 and/or 1108. The use of multiple seals is known to cause greater leakage, for example, between seal components, as compared to a single component seal.

Moreover, in the conventional configuration, it is necessary to install the seal components (not shown) individually, as each integrated combustor nozzle 1000 is installed into the gas turbine 10. Thus, after an integrated combustor nozzle 1000 is positioned, the respective (two or more) seal components are inserted in a circumferential (sideways) direction into the C-shaped slots defined along the sealing surfaces 1122a, 1122b of a first integrated combustor nozzle 1000, and then a circumferentially adjacent integrated combustor nozzle 1000 is maneuvered into position. Maintaining the multiple seals in their respective positions within the slots and preventing the seals from falling out of the respective slots while installing the subsequent integrated combustor nozzle 1000 is difficult, and care must be taken to install the subsequent integrated combustor nozzle 1000 in a manner that prevents the seal components from being crushed or damaged.

Additionally, the dogleg shape of the integrated combustor nozzle 1000 and the use of multiple end-to-end seals makes removal of any given integrated combustor nozzle 1000 difficult to achieve. Such removal required removing the seals at the forward (inlet) ends of the given integrated combustor nozzle 1000 and several adjacent integrated combustor nozzles 1000, "fanning out" the adjacent integrated combustor nozzles by pushing their forward ends circumferentially away from the given integrated combustor nozzle 1000, and then wresting the given integrated combustor nozzle 1000 from its position within the array. The removal process could also lead to damage of the aft seals, as the integrated combustor nozzles 1000 are repositioned.

These problems are addressed by the present integrated combustor nozzle 100 and its continuous seals 140 and 160, as shown in FIGS. 4 through 21.

Figure 4:
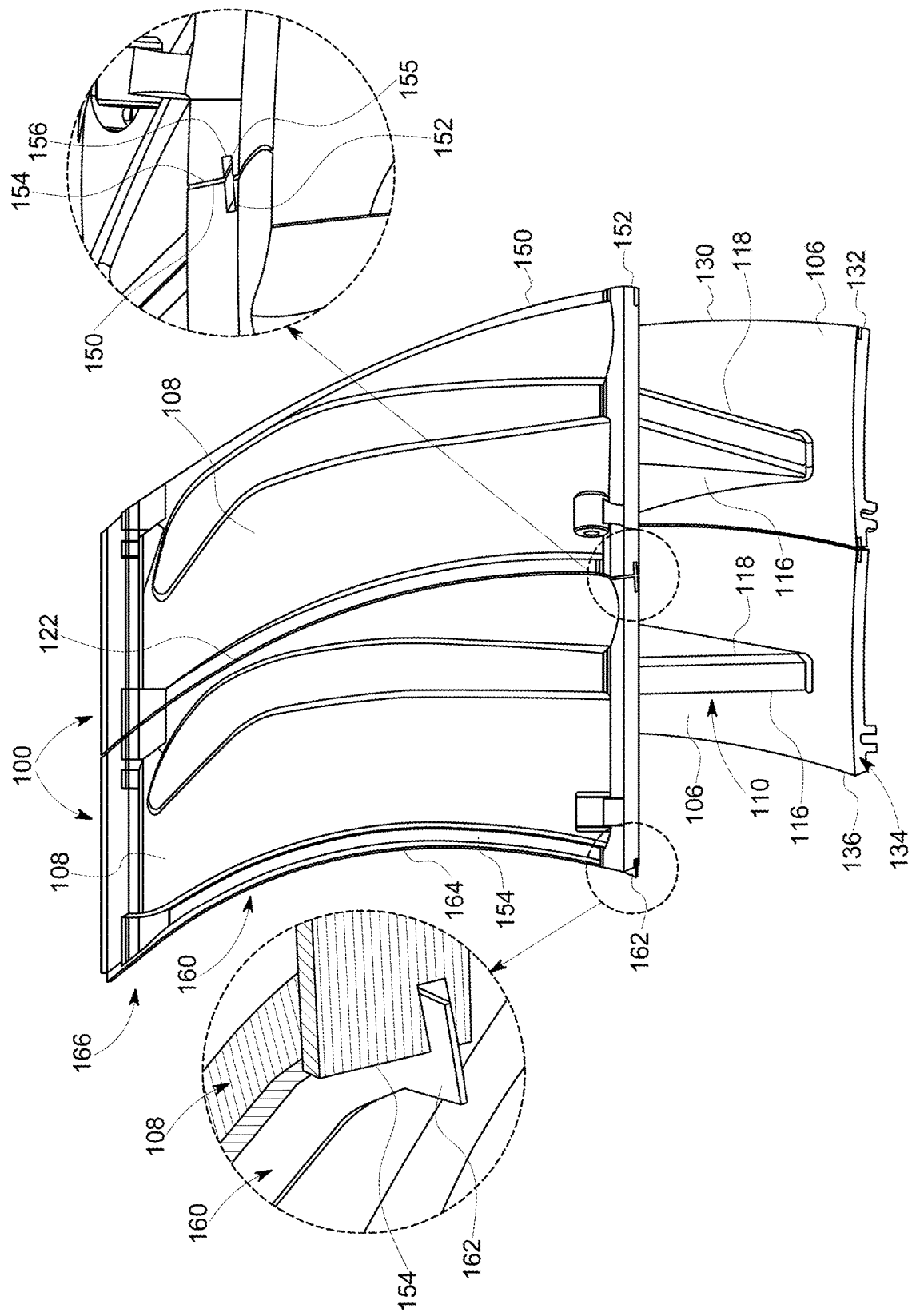
FIG. 4 is an overhead perspective view of two circumferentially adjacent integrated combustor nozzles, including a first call-out bubble illustrating a forward end of a seal and a second call-out bubble illustrating a seal recess, according to the present disclosure.

FIG. 4 illustrates a pair of circumferentially adjacent integrated combustor nozzles 100, as shown from a forward end 112. Each integrated combustor nozzle 100 includes an inner liner segment 106, an outer liner segment 108 radially separated from the inner liner segment 106, and a fuel injection panel 110 extending radially between the inner liner segment 106 and the outer liner segment 108. The fuel injection panel 110 includes a first (pressure) side wall 116 and a second (suction) side wall 118 that intersect at an aft end 114 to define a turbine (stage one) nozzle. For the sake of clarity, the fuel injection modules (as described above) are not shown, but should be understood as being positioned between the fuel injection panels 110 at the forward ends 112 of the integrated combustor nozzles 100.

Figure 7:
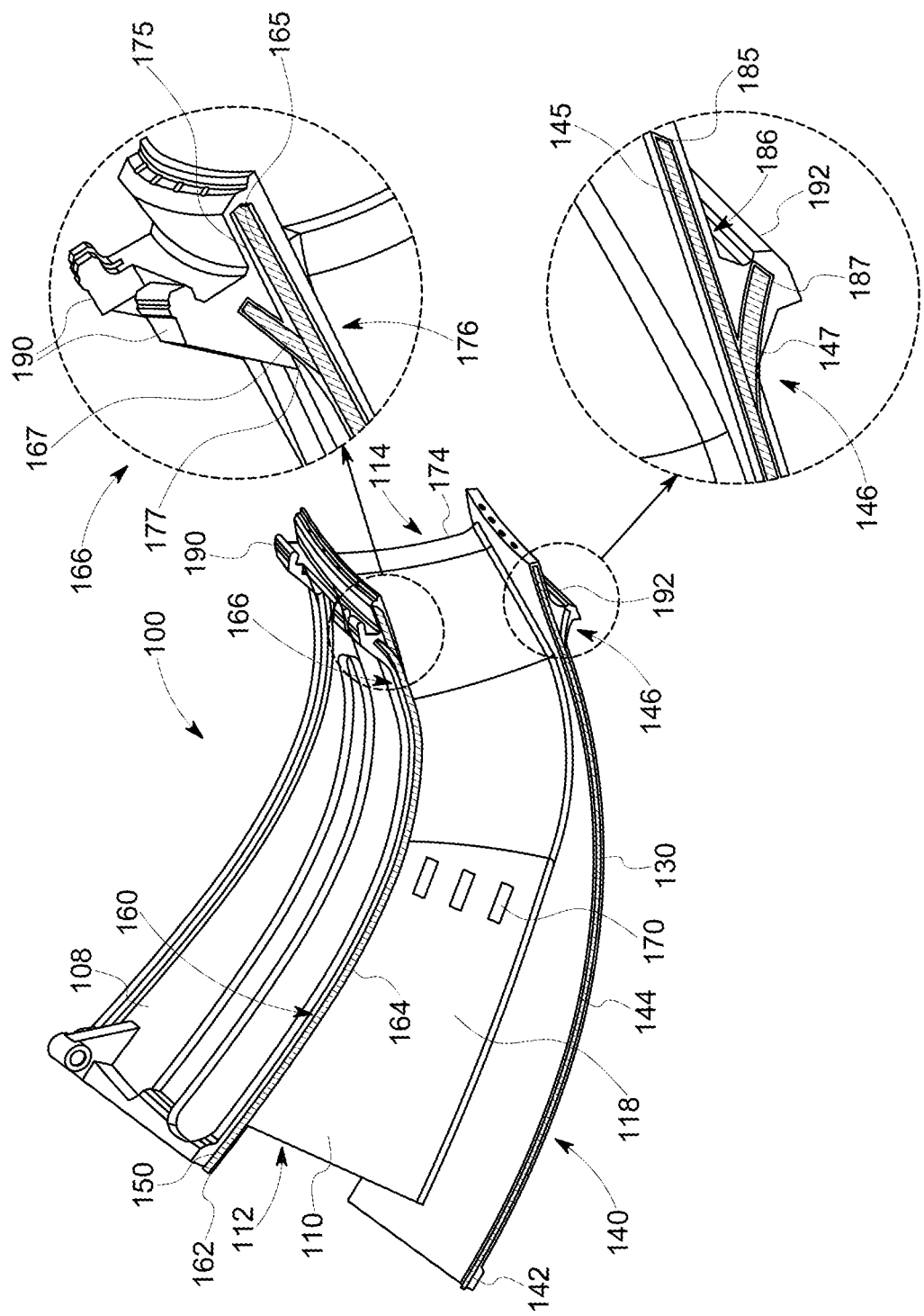
FIG. 7 is a side perspective view of one of the integrated combustor nozzles of FIG. 4, including a first call-out bubble illustrating an aft end slot for the inner liner seal and a second call-out bubble illustrating an aft end slot for the outer liner seal, according to the present disclosure.

The inner liner segment 106 includes a first sealing surface 130 and a second sealing surface 134, both of which extend in an axial direction and curve continuously in a circumferential direction from the forward end 112 to the aft end 114 (shown in FIG. 7). In one embodiment, the sealing surfaces 130, 134 may also curve in a radial direction, optionally with one or more inflection points.

Likewise, the outer liner segment 108 includes a first sealing surface 150 and a second sealing surface 154, both of which extend in an axial direction and curve continuously in a circumferential direction from the forward end 112 to an aft end 114. In one embodiment, the sealing surfaces 150, 154 may also curve in a radial direction, optionally with one or more inflection points.

To facilitate installation and removal of the integrated combustor nozzles 100 and their respective seals 140, 160, the inner and outer liner segments 106, 108 are provided with a curved shape along their respective sealing surfaces 130, 134, 150, 154, according to the following parameters. As described above, a first parameter is that the curved shape is continuous in the circumferential direction. In some instances, the curved shaped may be "monotonic" in the circumferential direction, meaning that, moving from the forward end to the aft end of the sealing surfaces 130, 134, 150, 154, the curve has a constant radius and has no inflection points where the radius of the curve changes (increases or decreases) to cause a change in the concavity of the curve. (It should be noted that the sealing surfaces 130, 134, 150, 154 may include one or more inflection points only in the radial direction, as descried below.) In some instances, the curved shape may have a continuously decreasing radius from the forward end 112 to the aft end 114, such as may be defined by a parabola or ellipse.

A second parameter is that the curved shape cannot intersect any part of the fuel injection panel 110, including the aft end 114. Because the fuel injection panel 110 is a discrete unit designed with fuel delivery passages to deliver fuel to the downstream combustion zones and separate air passages to ensure adequate cooling of the fuel injection panel 110, disrupting the flow of fluids through the fuel injection panel 110 is undesirable and would further complicate the sealing of adjacent integrated combustor nozzles 100.

A third parameter is that the same curved profile is used for the inner liner segment 106 and the outer liner segment 108. Said differently, the curved profile is translated radially through both the both inner liner segment 106 and the outer liner segment 108. Such a configuration permits the installation and removal of individual integrated combustor nozzles 100 in a generally axial direction, pushing or pulling the integrated combustor nozzles 100 along the curve and into or out of position (as shown in FIGS. 18 through 21).

Yet another parameter is that all the integrated combustor nozzles 100 are identical in the curved profile of the sealing surfaces 130, 134, 150, 154 of the inner liner segments 106 and the outer liner segments 108. There is no "key" integrated combustor nozzle 100 that is slightly different from the other integrated combustor nozzles 100 to secure the position of the annular array of integrated combustor nozzles 100. Rather, because each integrated combustor nozzle 100 is identically shaped, any of the integrated combustor nozzles 100 may be removed from the annular array without displacing the adjacent integrated combustor nozzles 100. Such an arrangement simplifies and shortens maintenance intervals, in the event that a single integrated combustor nozzle 100 requires inspection or maintenance.

Returning again to FIG. 4, on the inner liner segment 106, the first sealing surface 130 defines a first seal slot 132, and the second sealing surface 134 defines a second seal slot 136. The first seal slot 132 of a first inner liner segment 106 mates with the second seal slot 136 of a second inner liner segment 106 to define a recess 135 within which an inner liner seal 140 is installed.

On the outer liner segment 108, the first sealing surface 150 defines a first seal slot 152, and the second sealing surface 154 defines a second seal slot 156. As shown in a first call-out bubble in FIG. 4, the first seal slot 152 of a first outer liner segment 108 mates with the second seal slot 156 of a second outer liner segment 108 to define a recess 155 within which an outer liner seal 160 is installed. As shown in a second call-out bubble in FIG. 4, when the outer liner seal 160 is fully installed in the recess 155, a forward end 162 of the outer liner seal 160 is disposed within the seal slots 152, 156 defined between the sealing surfaces 150, 154.

Figure 5:
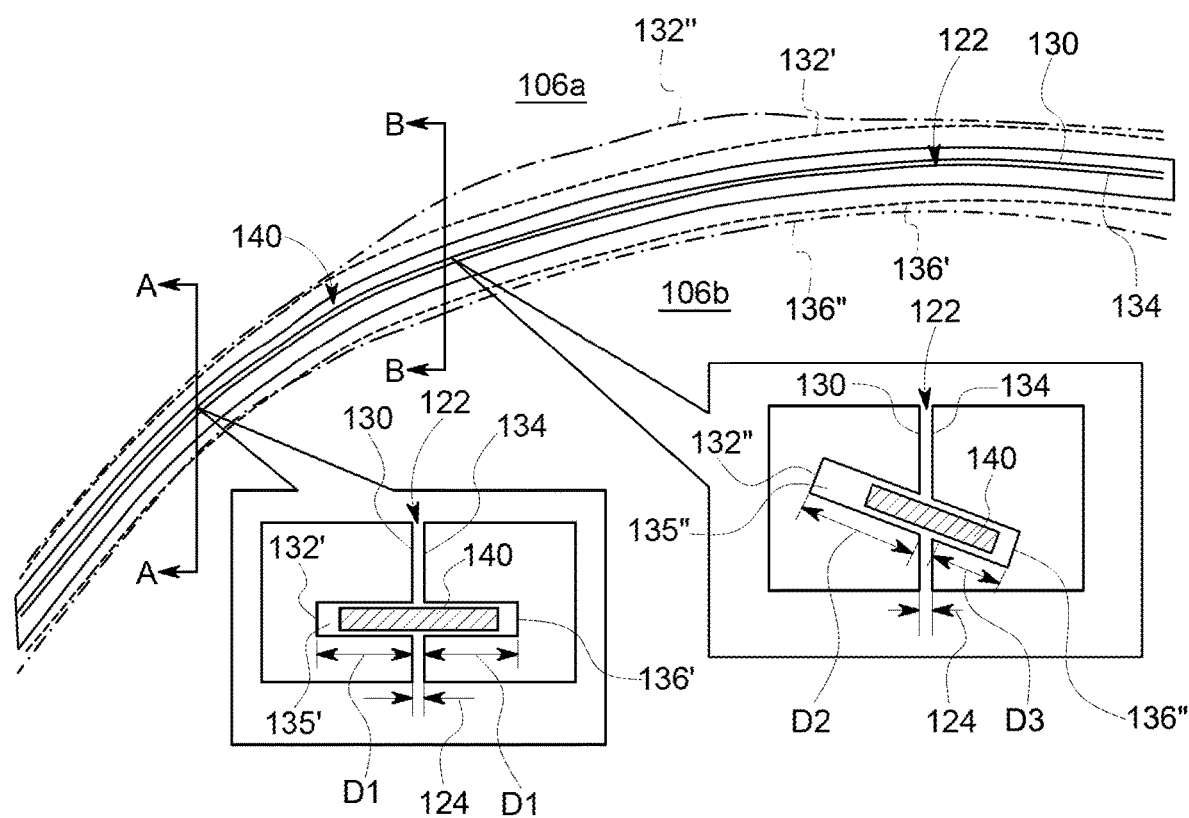
FIG. 5 is a schematic illustration of a seal of a uniform width disposed in a recess of non-uniform width, including a first call-out illustrating a symmetrical seal recess and a second call-out illustrating an asymmetrical seal recess, according to one aspect of the present disclosure.

The seal slots 132, 136, 152, and/or 156 may be normal (i.e., at a right angle) to the respective sealing surfaces 130, 134, 150, 154, and may be symmetrically sized and shaped about the joint 122 with each seal slot extending inwardly over a uniform distance from the sealing surface (as shown in the first call-out along plane A-A in FIG. 5). Alternately, the seal slots 132, 136, 152, and/or 156 may be disposed at an angle relative to the respective sealing surfaces 130, 134, 150, 154 and may be asymmetrically sized and shaped about the joint 122 (as shown in the second call-out along plane B-B in FIG. 5).

FIG. 5 schematically illustrates an inner liner seal 140 of uniform width W, which is installed in a recess of varying depths along the axial length. The seal 140 is identified with shading in FIG. 5 and with diagonal lines in the call-outs taken along plane A-A and plane B-B The sealing surface 130 of a first inner liner segment 106b and the sealing surface 136 of a second (adjacent) inner liner segment 106b are represented by solid lines. As shown, the sealing surfaces 130, 136 are positioned with a slight circumferential gap 124 at the joint 122 between adjacent integrated combustor nozzles 100. It is expected that the small gap 124 defined by the joint 122 will at least partially close due to thermal expansion of the integrated combustor nozzles 100 during operation of the segmented annular combustion system 36.

The dotted lines represent the nominal seal slots 132', 136' of the two adjacent inner liner segments 106a, 106b, "nominal" meaning the ordinary position of the closed wall of the seal slot 132, 136, when the seal slots 132, 136 are evenly distributed on each side of the gap 124 along the axial length of the sealing surfaces 130, 134.

The first call-out along plane A-A schematically represents a pair of adjacent seal slots 132', 136' at a given plane A-A located along the axial length of the seal slot 132, 136. The seal slots 132', 136' are symmetrically disposed about the joint 122 and extend inwardly over a uniform first depth (D1) from the respective sealing surface 130, 134. The seal 140 is disposed within the recess 135' defined by the seal slots 132, 136. The recess 135' has a volume V1.

According to another aspect provided herein, the dashed-dotted lines represent the customized seal slots 132", 136" of the two inner liner segments 106a, 106b. The customized seal slots 132", 136" are spaced at different distances from the gap 124 along the axial length of the inner liner segments 106a, 106b, creating localized areas where the recess 135 has a greater volume.

The second call-out along plane B-B schematically illustrates such a configuration, in which the seal slots 132, 134 are asymmetrical about the joint 122. In this exemplary embodiment, the seal slot 132" extends inwardly from the sealing surface 130 over a second depth D2, while the seal slot 136" extends inwardly from the sealing surface 134 over a third depth D3, which is different from the depth D2. Thus, during installation and operation, the seal 140 may be disposed anywhere within the recess 135 defined by the seal slots 132, 136. In this area, the recess 135" has a volume V2. In the exemplary embodiment, volume V1 is less than volume V2.

Alternately, or in addition, the seal slots 132, 136 (or 152, 156) may be symmetrical about the joint 122 along at least a portion of the axial length of the respective liner segment 108, 106. In some circumstances, such as those shown in the call-out taken along plane B-B, the seal slots 132, 136 (or 152, 156) may have an angular orientation relative to the sealing surfaces 130, 134 (or 150, 154) that changes over the axial length of the respective liner segment 106, 108. That is, the seal slots 132, 136 (or 152, 156) may be oriented normal to the sealing surface 130, 134 (or 150, 154) in some areas and may be oriented at an oblique angle relative to the sealing surface 130, 134 (or 150, 154) in other areas.

The seal slots 132, 136 of the inner liner segments 106 may be of the same depth as the seal slots 152, 156 of the outer liner segments 108. Alternately, it may be desirable that seal slots 132, 152 on the suction side 118 of the integrated combustor nozzle 100 have the same depth(s) over their axial lengths, while the seal slots 136, 156 on the pressure side 116 of the integrated combustor nozzle 100 have the same depth(s) over the axial lengths, which may or may not be the same as those used on the sealing surfaces 132, 152 on the suction side 118.

Figure 6:
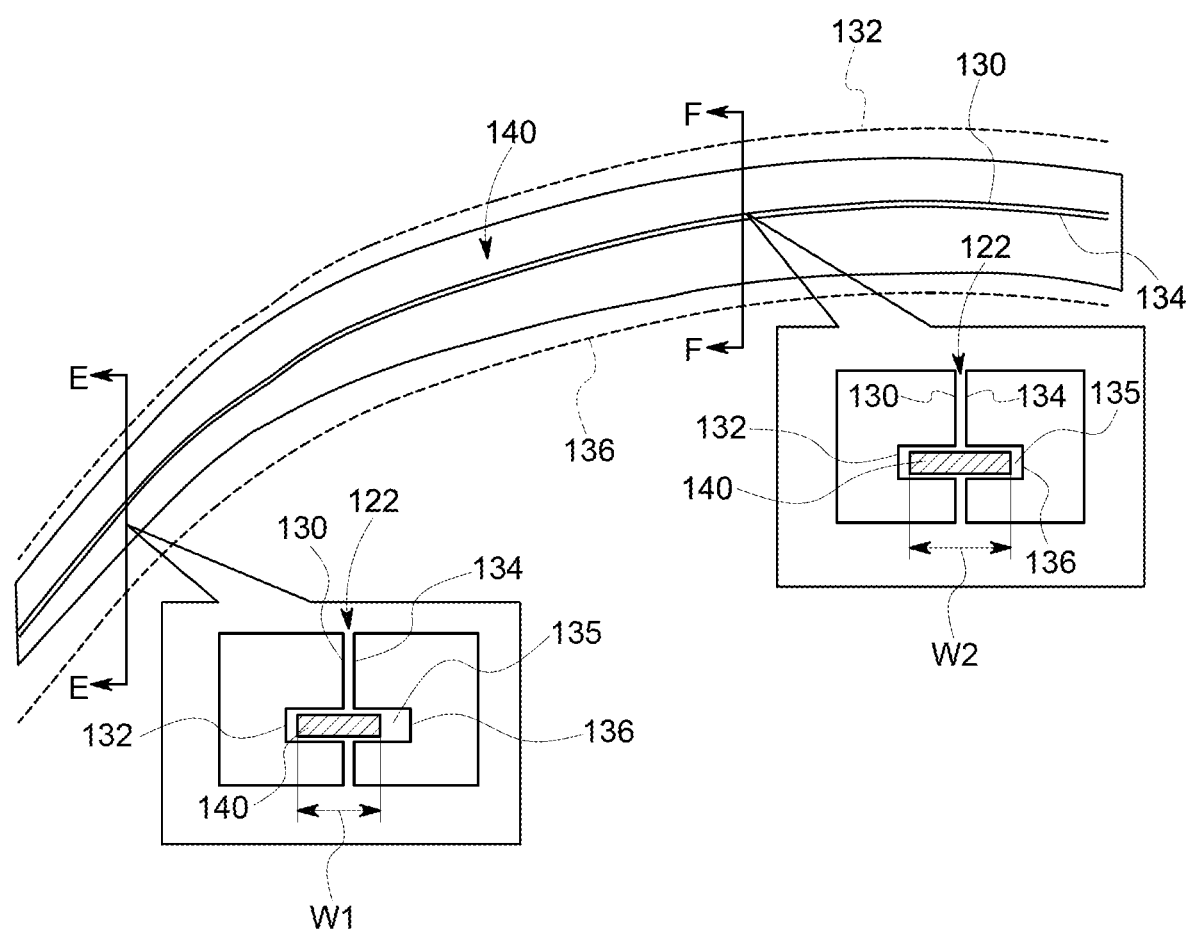
FIG. 6 is a schematic illustration of a seal of non-uniform width disposed in a recess of uniform width, including a first call-out illustrating a portion of the seal having a first width and a second call-out illustrating a portion of the seal having a second width different from the first width, according to another aspect of the present disclosure.

FIG. 6 schematically illustrates an embodiment of the present disclosure in which the inner liner seal 140 (or outer liner seal 160) has a width (W) that varies along the axial length of the seal 140 (or 160). As with FIG. 5, the sealing surfaces 130, 134 are illustrated with solid lines, the seal is shaded in the main image and shown in diagonal lines in the call-outs, and the seal slots 132, 136 are shown with dotted lines. The seal slots 132, 136 have a uniform depth (e.g., D1) from the gap 124 defined between the adjacent sealing surfaces 130, 134. However, the seal 130 has a varying width.

In the first call-out taken along plane E-E, the seal 130 has a first width W1. In the second call-out taken along plane F-F, the seal 130 has a second width W2. In the exemplary embodiment, the first width W1 is smaller than the second width W2, although other configurations may be possible.

By optimizing the shape of the seal 140 (or 160) in localized areas, as shown in FIG. 6, and/or by optimizing the shape of the seal slots 132, 136 (or 152, 156), as shown in FIG. 5, the installation and removal of the seal in the axial direction is facilitated, while minimizing the leakage around the seal itself. For instance, if the entire seal slot 132, 136 (or 152, 156) were provided with a larger cross-sectional area, and/or if the entire seal 140 (or 160) were given a narrower width, the leakage flows around the seal 140 (or 160) would be significantly higher. The use of selective, localized areas of greater cross-sectional area and/or smaller circumferential width achieve the sealing performance necessary for the successful operation of the present segmented annular combustion system 36.

FIG. 7 illustrates a single integrated combustor nozzle 100 in which the inner liner seal 140 and the outer liner seal 160 are installed in respective slots (132, 152) in the inner liner segment 106 and the outer liner segment 108. As illustrated, the fuel injection panel 110 extends radially between the inner liner segment 106 and the outer liner segment 108 and includes a plurality of injection outlets 170 from which a fuel/air mixture is introduced into a secondary combustion stage. The aft end 114 of the integrated combustor nozzle 100 has an airfoil shape with a trailing edge 174, reminiscent of a stage-one turbine nozzle, to turn and accelerate the flow of combustion products 30 into the turbine section 18 (shown in FIG. 1).

The outer liner seal 160 (shown separately in FIGS. 8 and 9) has a forward end 162, an aft end 166, and an intermediate section 164 extending between the forward end 162 and the aft end 166. The forward end 162 of the outer liner seal 160 fits within the seal slot 152 in the sealing surface 150 of the outer liner segment 108, as described above.

In the illustrated embodiment, the seal slot 152 (or 156) is open at the forward end 112 of the outer liner segment 108 and closed at the aft end 114 of the outer liner segment 108. The installation of the outer liner seal 160 may be accomplished by inserting, in an axial direction, the aft end 166 of the seal 160 into the recess 155 defined by the respective seal slots 152, 156 in each circumferential sealing surface 150, 154 of the two adjacent gas turbine components (i.e., the two integrated combustor nozzles 100), where the seal 160 has the aft end 166 axially and circumferentially offset from the forward end 162; and pushing the seal 160 in an axial direction through the recess 155 until the forward end 162 is disposed within the recess 155.

Alternately, if the seal slot 152 is open at the aft end 114 of the outer liner segment 108, the outer liner seal 160 may be installed, in the axial direction, from the aft end 114.

As with the outer liner seal 160, the inner liner seal 140 (shown separately in FIG. 10) has a forward end 142, an aft end 146, and an intermediate section 144 extending between the forward end 142 and the aft end 146.

In the illustrated embodiment, the seal slot 132 (or 136) is open at the forward end 112 of the inner liner segment 106 and closed at the aft end 114 of the inner liner segment 106. The installation of the inner liner seal 140 may be accomplished by inserting, in an axial direction, the aft end 146 of the seal 140 into the recess 135 defined by the respective seal slots 132, 136 in each circumferential sealing surface 130, 134 of the two adjacent gas turbine components (i.e., the two integrated combustor nozzles 100), where the seal 140 has the aft end 146 axially and circumferentially offset from the forward end 142; and pushing the seal 140 in an axial direction through the recess 135 until the forward end 142 is disposed within the recess 135.

Alternately, if the seal slot 132 is open at the aft end 114 of the inner liner segment 106, the inner liner seal 140 may be installed, in the axial direction, from the aft end 114.

FIG. 7 also provides enlarged views of the aft end 166 of the outer liner seal 160 and the aft end 146 of the inner liner seal 140. In the exemplary embodiment shown, the sealing surface 150 (or 154) at the aft end 114 of the outer liner segment 108 may diverge radially outward from the seal slot 152 (or 156) due to the presence of mounting hook(s) 190 provided on the outer surface of the outer liner segment 108.

Figure 8:
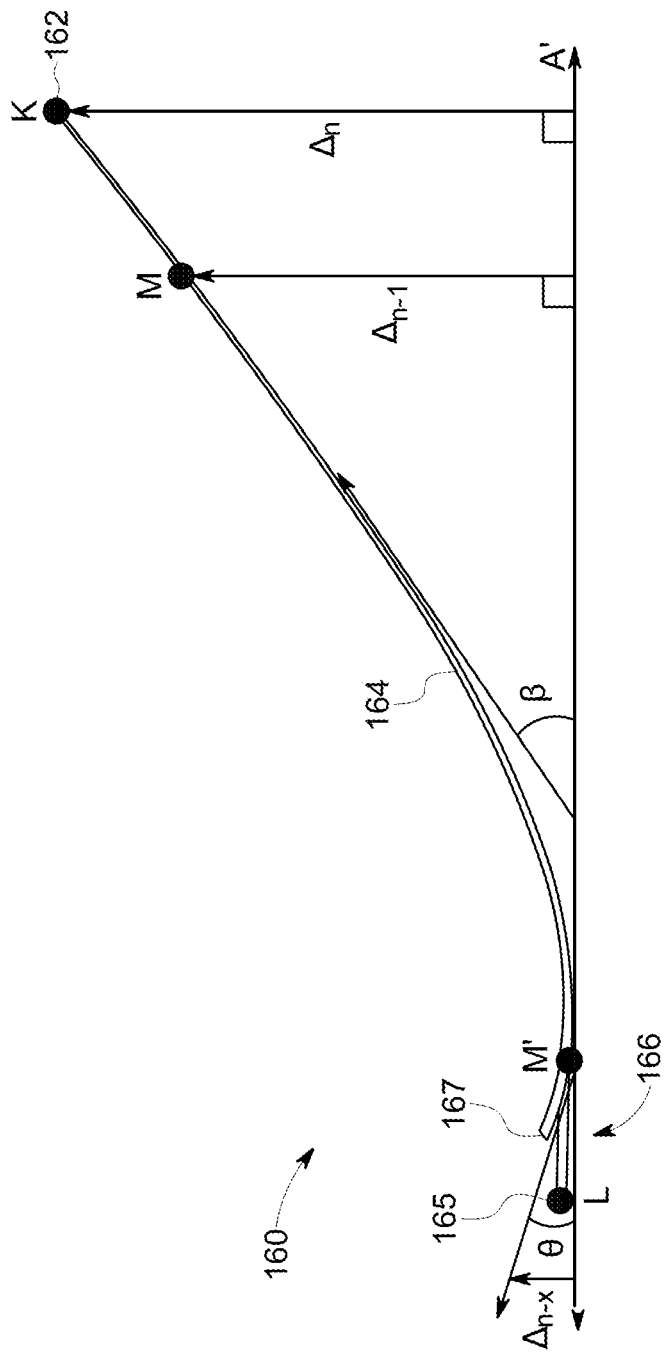
FIG. 8 is a side perspective view of an outer liner seal, as may be used with the present integrated combustor nozzles.

As shown in FIG. 8, the aft end 166 of the outer liner seal 160 may be bifurcated (i.e., divided into two branches) to fit within a corresponding bifurcated downstream slot 176. In the exemplary embodiment, a second branch 167 of the aft end 166 of the outer liner seal 160 is shorter than a first branch 165 of the aft end 166 of the outer liner seal 160, although, in other embodiments, the second branch 167 may be of equal length as the first branch 165 or may be longer than the first branch 165.

The first branch 165 of the aft end 166 of the outer liner seal 160 is configured to fit within a first (axially-oriented) portion 175 of the downstream slot 176, the first portion 175 of the downstream slot 176 being continuous with the seal slot 152 (or 156). The second branch 167 of the aft end 166 of the outer liner seal 160 is configured to fit within a second (angled) portion 177 of the downstream slot 176, the second portion 177 of the downstream slot 176 being disposed within the mounting hook(s) 190 at an angle relative to the first portion 175 of the downstream slot 176. The angle Θ (theta) of the divergence (shown in FIG. 8) between the first branch 165 and the second branch 167 of the outer liner seal 160 is in a range from about 5 degrees to about 75 degrees.

Figure 11:
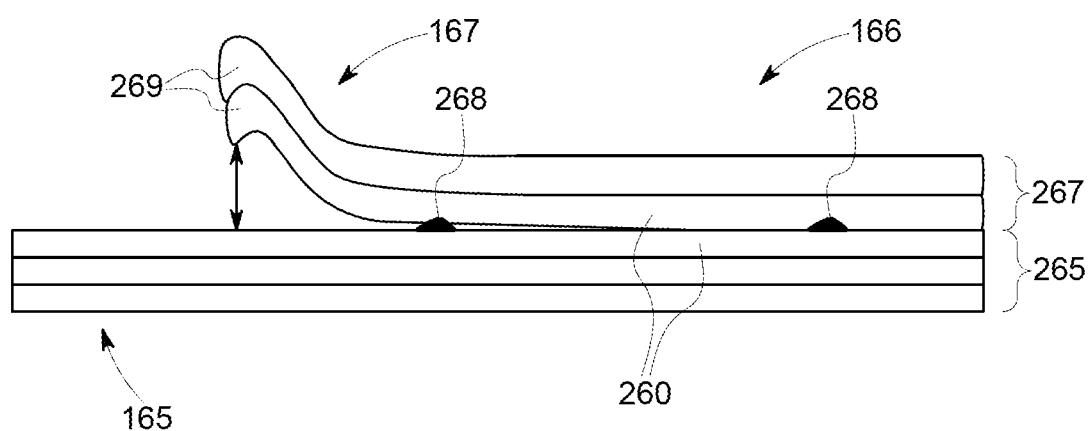
FIG. 11 is a schematic side view of an aft end of the outer liner seal of FIG. 8, illustrating a multi-ply seal.

FIG. 8 provides a side perspective view of the outer liner seal 160 with its forward end 162, its aft end 166, and an intermediate portion 164 between the forward end 162 and the aft end 166. The outer liner seal 160 is a flexible metal seal and, in some embodiments (as shown in FIG. 11), includes multiple plies. The intermediate portion 164 defines a continuous circumferential curve that is complementary to the continuous circumferential curve defined by the sealing surfaces 150, 154, as described above.

To facilitate discussion, the forward end 162 of the outer liner seal 160 has been designated as a point K; the aft end 166 of the outer liner seal 160, as point L; any point along the continuous circumferential curve between K and L, as point M; and an inflection point in only the radial direction, as point M'. The inflection point M' is present when the seal 160 is installed between the two adjacent integrated combustor nozzles 100. The axial distance between points K and L may fall within the range of 2 inches (about 5 centimeters) to 50 inches (127 centimeters), depending on the size of the components being sealed.

The angle Θ (theta) is defined between an axial reference line A' drawn through the inflection point M' and an imaginary line drawn through the second branch 165. The distance between the first branch 165 and the second branch 167 may be represented as Δ(n−x) (delta (n minus x)), where x is any value that results in angle theta falling within the range of 5 degrees to 75 degrees.

The distance between the forward end 162 (point K) and the axial reference line A' may be represented as Δn (delta n), and the distance between the intermediate point M and the axial reference line A' may be represented as Δ(n−1) (delta (n minus one)), because the distance between point M and line A' is less than the distance between point K and line A'. In this particular embodiment, point K at the forward end 162 and point L at the aft end 166 are radially offset from one another, although, in other embodiments, the outer liner seal 160 may have no radius of curvature in the radial direction. In other words, the outer liner seal 160 may be a straight seal in a single radial plane, while still maintaining the continuous curve in the circumferential direction.

The angle β (beta) is defined between the axial reference line A' and an imaginary line drawn through the forward end (point K). The angle β (beta) represents the cant angle of the integrated combustor nozzle 100.

Figure 9:
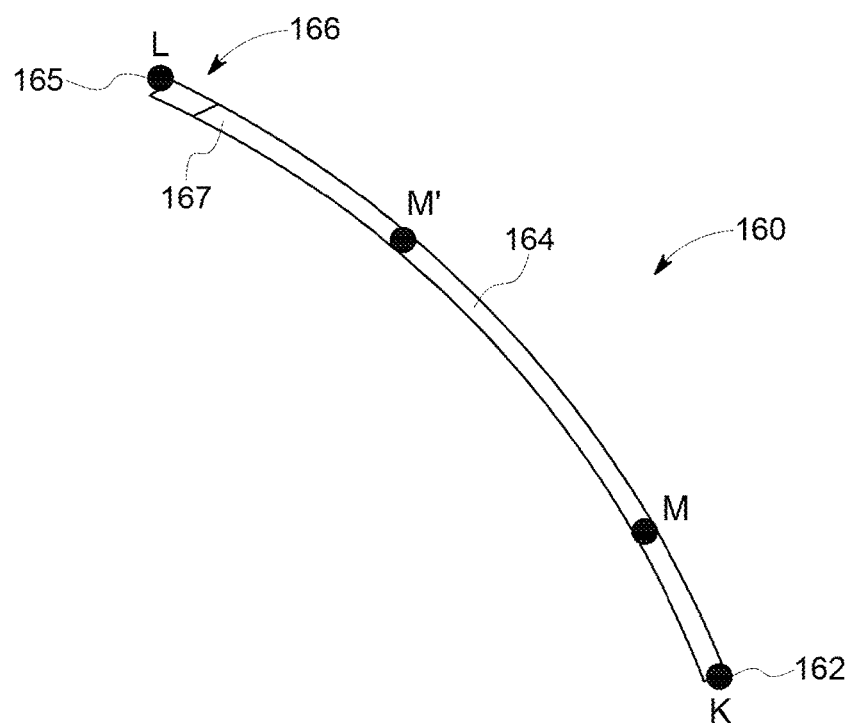
FIG. 9 is an overhead plan view of the outer liner seal of FIG. 8.

In providing an overhead plan view, FIG. 9 perhaps most clearly illustrates the continuous circumferential curve of the outer liner seal 160. As shown, the curve is continuous from point K at the forward end 162 through intermediate point M and radial inflection point M' to point L at the aft end 166 (specifically at the branch 165). Point K is circumferentially offset from point L (that is, the forward end 162 and the aft end 166 are not coplanar in the axial direction). Notably, point M', which is an inflection point in the radial direction (apparent when the seal is installed), is just another point of the continuous curve defined in the circumferential direction. The outer liner seal 160 may have a radius of curvature in the circumferential direction that ranges from about 10 inches to about 120 inches.

This continuous circumferential curve permits the outer liner seal 160 to be installed in, and removed from, the recess 155 defined by the adjacent sealing surfaces 150, 154 of adjacent outer liner segments 108 by pushing, or pulling, the outer liner seal 160 in an axial, or substantially axial, direction. As a result, the positioning of the outer liner seal 160 is accomplished in an efficient manner, and the likelihood of the outer liner seal 160 being damaged during installation is significantly reduced. Additionally, because a single outer liner seal 160 spans the axial length of the integrated combustor nozzle 100, the seal leakages (that would otherwise accompany multiple seals in an end-to-end arrangement) are reduced.

Additionally, in exemplary seals in which there is no radial component (i.e., flat seals having points K and L in the same radial plane), these flat seals have the seal profile shown in FIG. 9.

Figure 10:
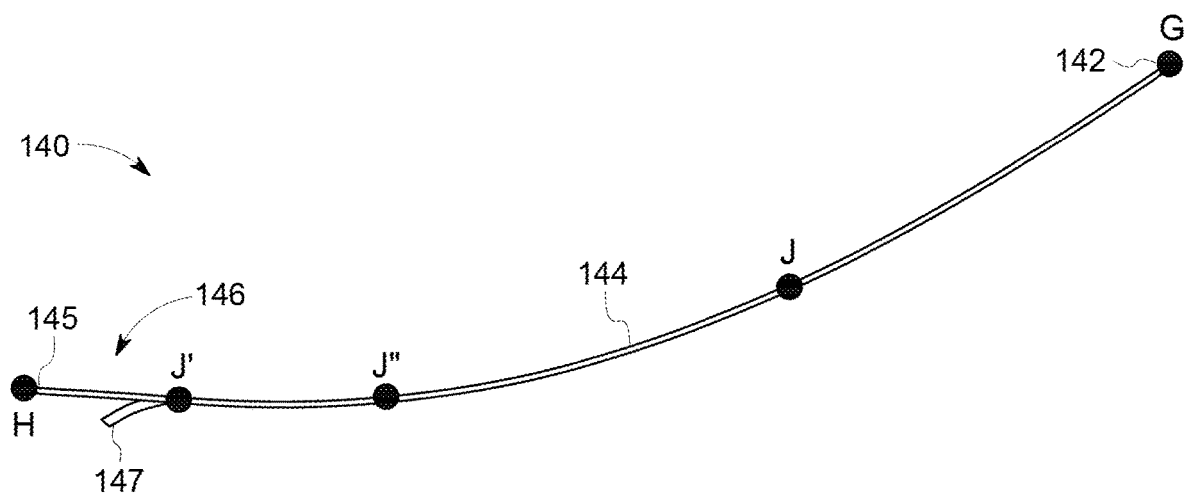
FIG. 10 is a side perspective view of an inner liner seal, as may be used with the present integrated combustor nozzles.

Similarly, as shown in FIGS. 7 and 10, the aft end 146 of the inner liner seal 140 may be bifurcated (i.e., divided into two branches) to fit within a corresponding bifurcated downstream slot 186. In the exemplary embodiment, a second branch 147 of the aft end 146 of the outer liner seal 140 is shorter than a first branch 145 of the aft end 146 of the inner liner seal 140, although, in other embodiments, the second branch 147 may be of equal length as the first branch 145 or may be longer than the first branch 145.

The first branch 145 of the aft end 146 of the inner liner seal 140 is configured to fit within a first (axially-oriented) portion 185 of the downstream slot 186, the first portion 185 of the downstream slot 186 being continuous with the seal slot 132 (or 136). The second branch 147 of the aft end 146 of the inner liner seal 140 is configured to fit within a second (angled) portion 187 of the downstream slot 186, the second portion 187 of the downstream slot 186 being disposed within an inner hook plate 192 at an angle relative to the first portion 185 of the downstream slot 186. The angle of the divergence between the first branch 145 and the second branch 147 is in a range from about 5 degrees to about 75 degrees.

The inner liner seal 140 is a flexible metal seal and, in some embodiments, includes multiple plies. The inner liner seal 140 includes the forward end 142 (designated as point G), the aft end 146 (designated as point H), and an intermediate portion 144 between the forward end 142 and the aft end 146. The axial distance between points G and H may fall within the range of 2 inches (about 5 centimeters) to 50 inches (127 centimeters), depending on the size of the components being sealed.

The intermediate portion 144 defines a continuous circumferential curve that is complementary to the continuous circumferential curve defined by the sealing surfaces 130, 134, as described above. In one embodiment, the continuous circumferential curve is monotonic (i.e., having a constant radius that does not increase or decrease in the circumferential direction). Point J represents any point along the intermediate portion 144 between points G and H. Point J' and point J" represent two inflection points occurring only in the radial direction between points G and H, when the seal 140 is installed between the two adjacent integrated combustor nozzles 100.

FIG. 11 schematically illustrates the aft end 166 of the outer liner seal 160 according to one embodiment of the present disclosure, although it may equally represent the aft end 146 of the inner liner seal 140. As described above, the aft end 166 of the outer liner seal 160 is bifurcated into two branches 165, 167. One method of providing such a seal 160 is to provide multiple seal plies 260 (e.g., shims or laminated splines) that are spot-welded, or otherwise joined together, at one or more locations (e.g., spot-welds 268) along a majority of the axial length of the seal 160. For instance, a first set 265 of plies 260 may be joined to a second set 267 of plies 260 from the forward end 142 through the intermediate portion 144 of the outer liner seal 160, while the aft ends of the first set 265 of plies 260 are separate from the aft ends of the second set 267 of plies 260 to form a bi-furcated aft end 166 of the seal 160.

Each seal ply 260 may be formed from a thin rectangular strip of a metal or metal alloy and may have a desired width, length, and thickness. Suitable materials for the seal plies 260 may be selected based upon their elastic properties, temperature tolerance, and other physical characteristics for compatibility with the environment in the segmented annular combustor 36. The individual plies 260 may be the same or different in their materials, thicknesses, width, or length, and may possess the same or different characteristics, such as elasticity, flexibility, yield strength, oxidation resistance, or sealing characteristics, to facilitate joining, insertion, and retention. The thickness or width of the seal plies 260 may vary along the length of the seal 160.

In the exemplary embodiment, three plies 260 are provided in the first set 265 to define the first branch 165 of the seal 160, while two plies 260 are provided in the second set 267 to define the second branch 167 of the seal 160. The plies 260 used in the first set 265 may be joined to one another by one method (such as lamination or spot-welding), which is the same as or different from the method used to join the plies 260 used in the second set 267, before the first set 265 of plies 260 is joined to the second set 267 of plies 260.

Alternately, the first branch 165 of the seal 160 may be produced using a single seal ply 260, and the second branch 167 of the seal 160 may be produced using a single seal ply 260, which may or may not be joined to the single seal ply 260 of the first branch 165. If the ply or plies forming the first branch 165 and the second branch 167 are un-joined, the plies may be installed sequentially or simultaneously in the respective recess 155 between two adjacent outer liner segments 108. The ply or plies forming the first branch 165 may have a width that is the same or different from the ply or plies forming the second branch 167. Similarly, the ply or plies forming the first branch 165 may have a thickness that is the same or different from the ply or plies forming the second branch 167.

In the exemplary embodiment, the ply or plies 260 forming the second branch 167 of the seal 160 are slightly bent or curved at the ends 269 toward the first branch 165, creating a spring-like effect in the second branch 167 (as represented by the arrow between the first branch 165 and the second branch 167). During installation of the seal 160, the seal installer may depress the second branch 167 toward, or into contact with, the first branch 165, so that the seal 160 fits within the recess 155 formed by the adjacent seal slots 152, 156.

Because the seal 160 is flexible (at least in the radial direction), the seal 160 may be pushed in an axial direction through the recess 155 until the aft end 166 of the seal 160 reaches the bifurcation location at the aft end 114 of the outer liner segment 108. As the seal slots 175, 177 separate from one another, the tension on the spring-loaded second branch 167 is released, causing the second branch 167 to diverge from the first branch 165 and be pushed into the second seal slot 177. A similar installation process may be used for the inner liner seal 140.

While installing the seals 140, 160 in an axial direction results in quicker assembly, it should be understood that the present disclosure does not limit the installation of the seals as being only in the axial direction. Rather, the seals 140, 160 may be installed circumferentially, as is conventional, after each integrated combustor nozzle 100 is positioned, noting that the final set of seals 140, 160 may be advantageously installed in an axial direction.

In an alternate embodiment, the seals 140, 160 may include first seal segments that extend along the length of the recesses 135, 155 and into the first branches 145, 165, while second seal segments (not joined to the first seal segments) extend along the length of the recesses 135, 155 and into the second branches 145, 165. The first seal segments may be a single layer shim or a multi-ply seal, as described above. Likewise, the second seal segments may be a single-layer shim or a multi-ply seal, as described above. The first and second seal segments may be installed sequentially or simultaneously in the respective recess 155 between two adjacent outer liner segments 108.

To absorb the thermal stresses experienced by the outer liner seal 160 during operation of the segmented annular combustor 36, the forward end 162 of the outer liner seal 160 may be provided with an anchor 200. The presence of the anchor 200, which is installed in an anchor cavity 240 (see FIG. 17) at the forward end 112 of the integrated combustor nozzle 100, reduces the likelihood that the outer liner seal 160 will be twisted or distorted during operation of the segmented annular combustor 36. The inner liner seal 140 may be provided with an anchor 200, in addition to, or instead of, the anchor 200 on the outer liner seal 160. Any description below of the outer liner seal 160 and its anchor 200 may be applicable to the inner liner seal 140 and its anchor 200, as well.

FIGS. 12 through 17 schematically illustrate various embodiments of the anchor 200 and its connection to the forward end 162 of the outer liner seal 160, by way of example.

The anchor 200 is illustrated as having a shape resembling a rectangular prism, although the anchor 200 may have other shapes or may be irregularly shaped. The anchor 200 includes a first surface 201 that is radially outward from the axial centerline 38 of the segmented annular combustor 36, when the outer liner seal 160 is installed; and a second surface 203 that is opposite the first surface 201 and that is radially inward toward the axial centerline 38. Side walls 205 connect the first surface 201 to the second surface 203. To facilitate removal of the outer liner seal 160, the anchor 200 may include a through-hole 210 or an indentation 220, within which a removal tool 250 (shown in FIG. 17) may be inserted to pry the outer liner seal 160 from the seal recess 155.

Figure 12:
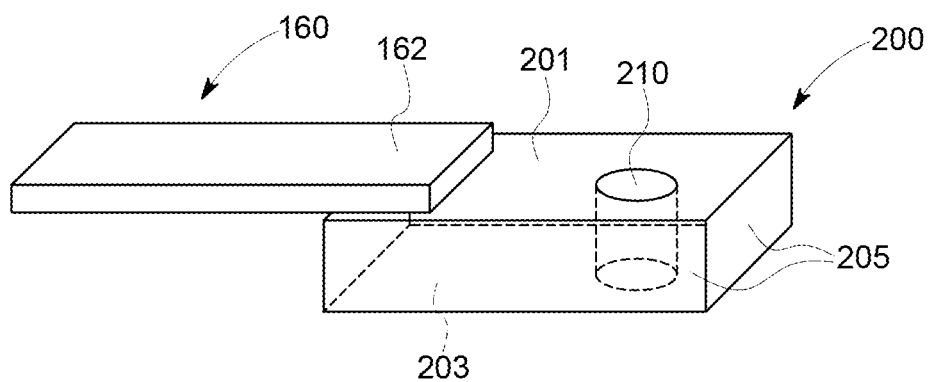
FIG. 12 is a schematic perspective view of an anchor attached to a forward end of the outer liner seal of FIG. 8, in which the anchor defines a through-hole for removal of the outer liner seal.

FIG. 12 illustrates an embodiment in which the radially outward surface 201 of the anchor 200 is secured to the forward end 162 of the outer liner seal 160, for example, by brazing or welding. The through-hole 210 extends through the anchor 200 from the radially outward surface 201 to the radially inward surface 203. A removal tool having a hook or shaft (such as a tool 250, shown in FIG. 17) may be inserted within the through-hole 210 and be used to pull the outer liner seal 160 from the seal recess 155. One benefit associated with the use of anchors 200 with through-holes 210 is the ability to collect the seals 160 on a common storage device, such as a ring, after removal or before installation.

Figure 13:
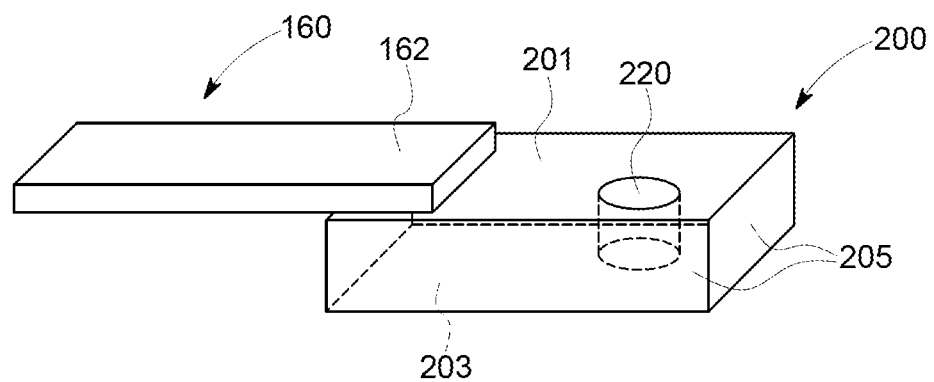
FIG. 13 is a schematic perspective view of an anchor attached to a forward end of the outer liner seal of FIG. 8, in which the anchor defines an indentation from an upper surface of the anchor for removal of the outer liner seal.

FIG. 13 illustrates an embodiment in which the radially outward surface 201 of the anchor 200 is secured to the forward end 162 of the outer liner seal 160, for example, by brazing or welding. The indentation 220 extends inwardly from the radially outward surface 201 of the anchor 200 and defines an area in which a tool shaft (e.g., of a tool akin to an Allen wrench) may be inserted. Although shown as having a round shape, it should be understood that the indentation 220 may have some other shape or may be provided with a keyhole feature to engage a key on the removal tool.

Figure 14:
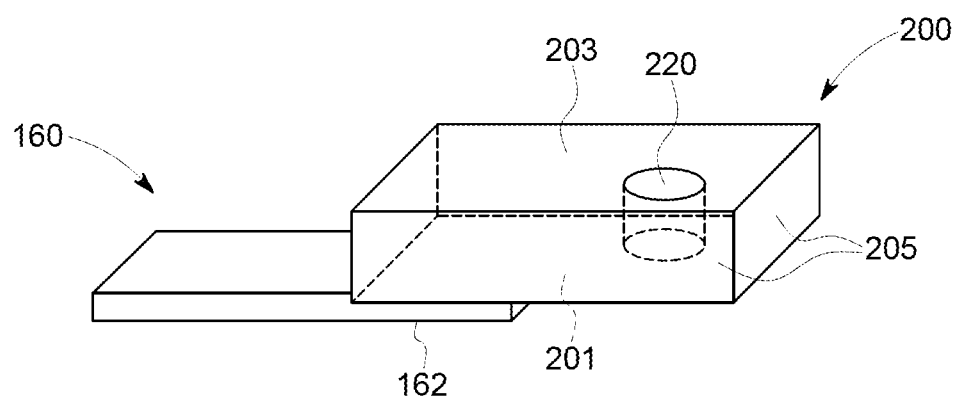
FIG. 14 is a schematic perspective view of an anchor attached to a forward end of the outer liner seal of FIG. 8, in which the anchor defines an indentation from a bottom surface of the anchor for removal of the outer liner seal.

FIG. 14 illustrates an embodiment in which the indentation 220 extends inwardly from the radially inward surface 203 of the anchor 200 and defines an area in which a tool shaft may be inserted, as described above. Alternately, the indentation 220 may be replaced by a through-hole 210.

Figure 15:
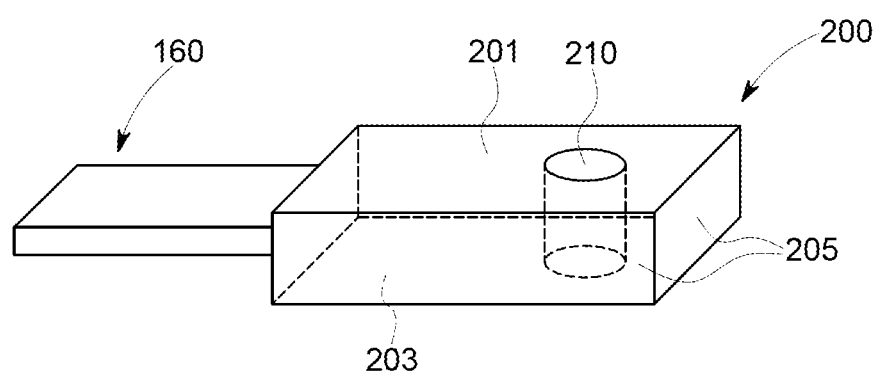
FIG. 15 is a schematic perspective view of a forward end of the outer liner seal of FIG. 8 installed within an anchor, according to an aspect of the present disclosure.
Figure 16:
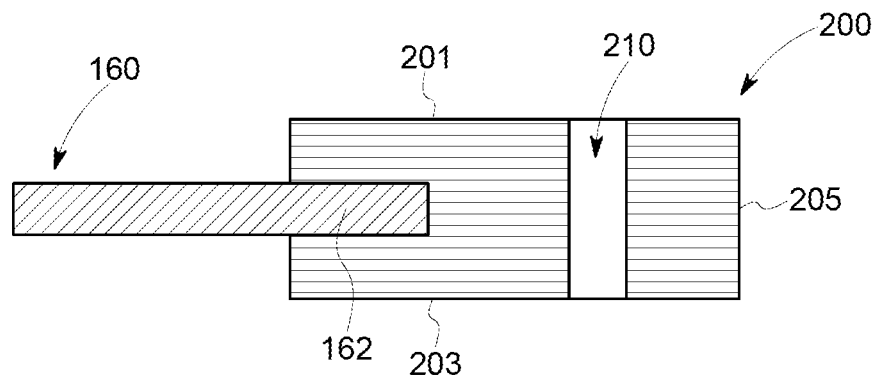
FIG. 16 is a schematic cross-sectional side view of the outer liner seal and the anchor of FIG. 15.

FIGS. 15 and 16 illustrate an embodiment in which the forward end 162 of the outer liner seal 160 may be secured within the anchor 200. The anchor 200 may include a through-hole 210 that extends from the radially outward surface 201 to the radially inward surface 203 in a position disposed apart from the forward end 162 of the outer liner seal 160. Alternatively, the anchor 200 may include an indentation 220, as described above, which projects inwardly from either the radially outward surface 201 or the radially inward surface 203.

Figure 17:
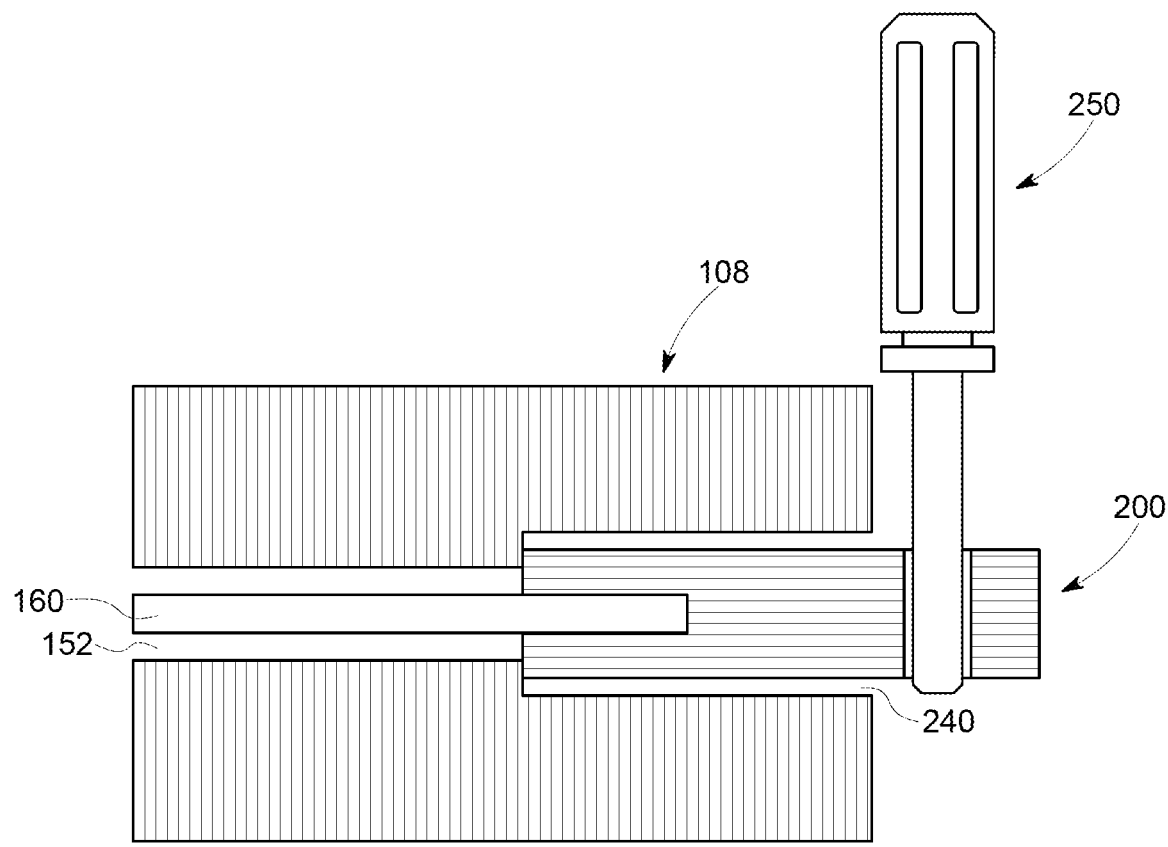
FIG. 17 is a schematic cross-sectional side view of the outer liner seal and the anchor of FIG. 15, as installed within a forward end of a seal slot, according to another aspect of the present disclosure.

At the forward end of the seal slots 152, 156 (one of which is shown in FIG. 17), an anchor cavity 240 is provided to secure the anchor 200, and thereby the seal 160, in its position within the seal slot 152, 156. The anchor cavity 240 allows the torque absorbed by the anchor 200 to be transmitted into the seal slots 152, 156 and minimizes the torque transmitted to the seal 160 itself. Other configurations of the anchor cavity 240 may be used, as needs dictate.

Where a first seal segment is used in a first branch and a second seal segment is used in a second branch, one or both the seal segments may include an anchor at its forward end. If both seal segments are provided with an anchor, the anchors may be interlocking or configured to join one another.

FIGS. 18 through 21 show the removal of an integrated combustor nozzle 100b from an array of three adjacent integrated combustor nozzles 100a, 100b, 100c.

Figure 18:
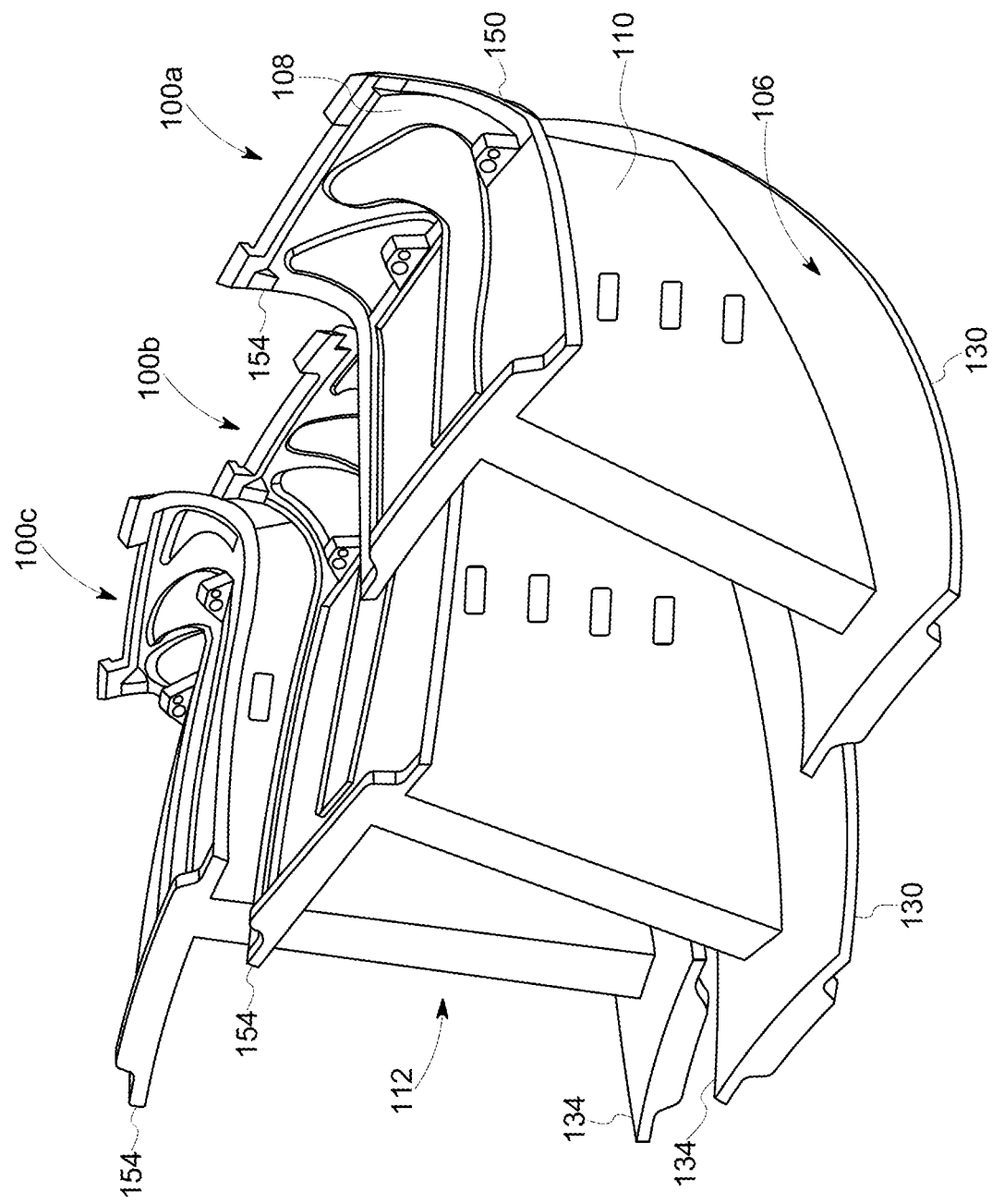
FIG. 18 is a perspective, forward-looking-aft view of three circumferentially adjacent integrated combustor nozzles, one of which is partially removed.

In FIG. 18, the inner liner seals 140 and the outer liner seals 160 have been removed from the respective sealing surfaces 130, 134 and 150, 154 between the first integrated combustor nozzle 100a and the second integrated combustor nozzle 100b and between the second integrated combustor nozzle 100b and the third integrated combustor nozzle 100c. By removing the (four) seals 140, 160 holding the integrated combustor nozzle 100b in place, the integrated combustor nozzle 100b is able to be removed in a generally axial direction by translating the movement of the integrated combustor nozzle 100b along the continuous circumferential curve defined by the sealing surfaces 130, 134, 150, 154. It should be noted that the removal of the integrated combustor nozzle 100b may result in the integrated combustor nozzle 100b being slightly radially inward (or outward) of the adjacent integrated combustor nozzles 100a, 100c, although this radial offset does not alter the direction of movement necessary to complete the removal of the desired integrated combustor nozzle 100b.

Figure 19:
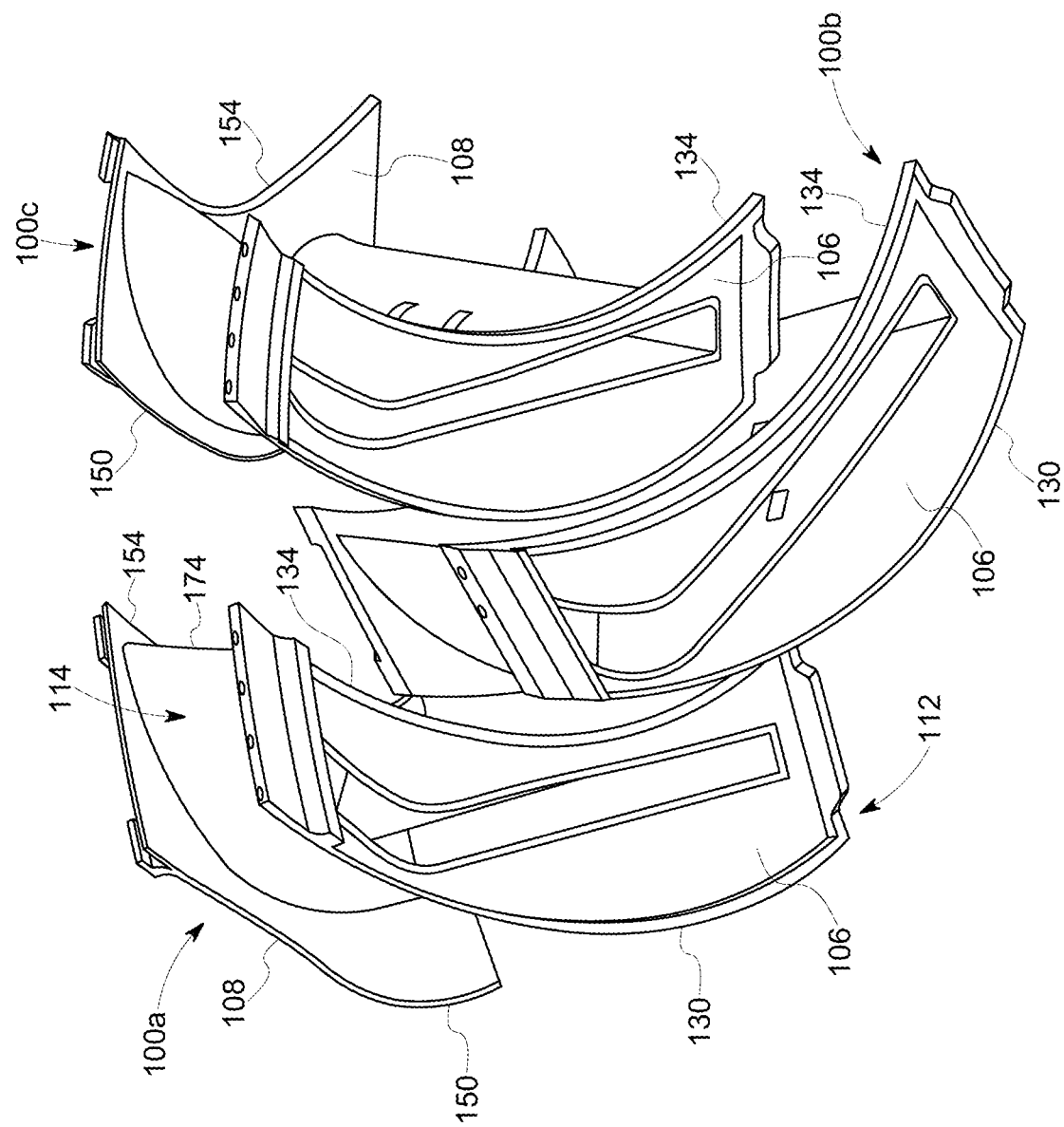
FIG. 19 is a perspective, inward-looking-outward view of the integrated combustor nozzles of FIG. 18, as shown from the inner liner segments, with one of the integrated combustor nozzles being further removed.

FIG. 19 provides a view from the inner liner segment 106 of the removal of the integrated combustor nozzle 100b. As shown, the continuous circumferential curve of the sealing surfaces 130, 134, 150, 154 of each integrated combustor nozzle 100a, 100b, 100c permits the removal of any integrated combustor nozzle 100 from the circumferential array of integrated combustor nozzles 100 that create the segmented annular combustor 36 (as in FIG. 2).

Figure 20:
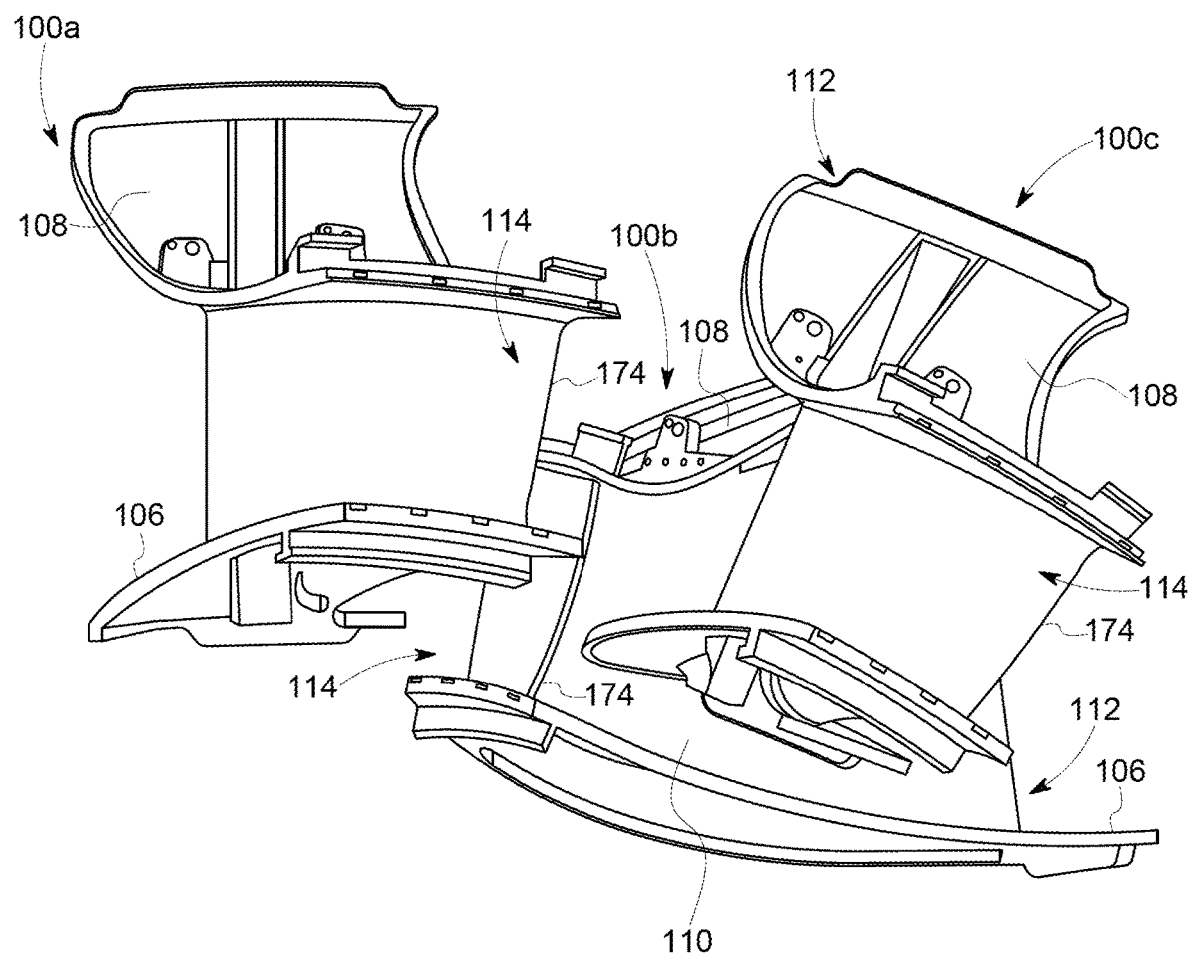
FIG. 20 is a perspective, aft-looking-forward view of the integrated combustor nozzles of FIG. 18, as shown from the aft end of the integrated combustor nozzles.

FIG. 20 provides an aft-looking-forward perspective view of the removal of the integrated combustor nozzle 100b at a later stage of removal than the stage shown in FIG. 19. As described previously, the aft ends 114 of the integrated combustor nozzles 100a, 100b, 100c terminate in the trailing edges 174, which turn and accelerate the flow of combustion products into the turbine section 18.

Figure 21:
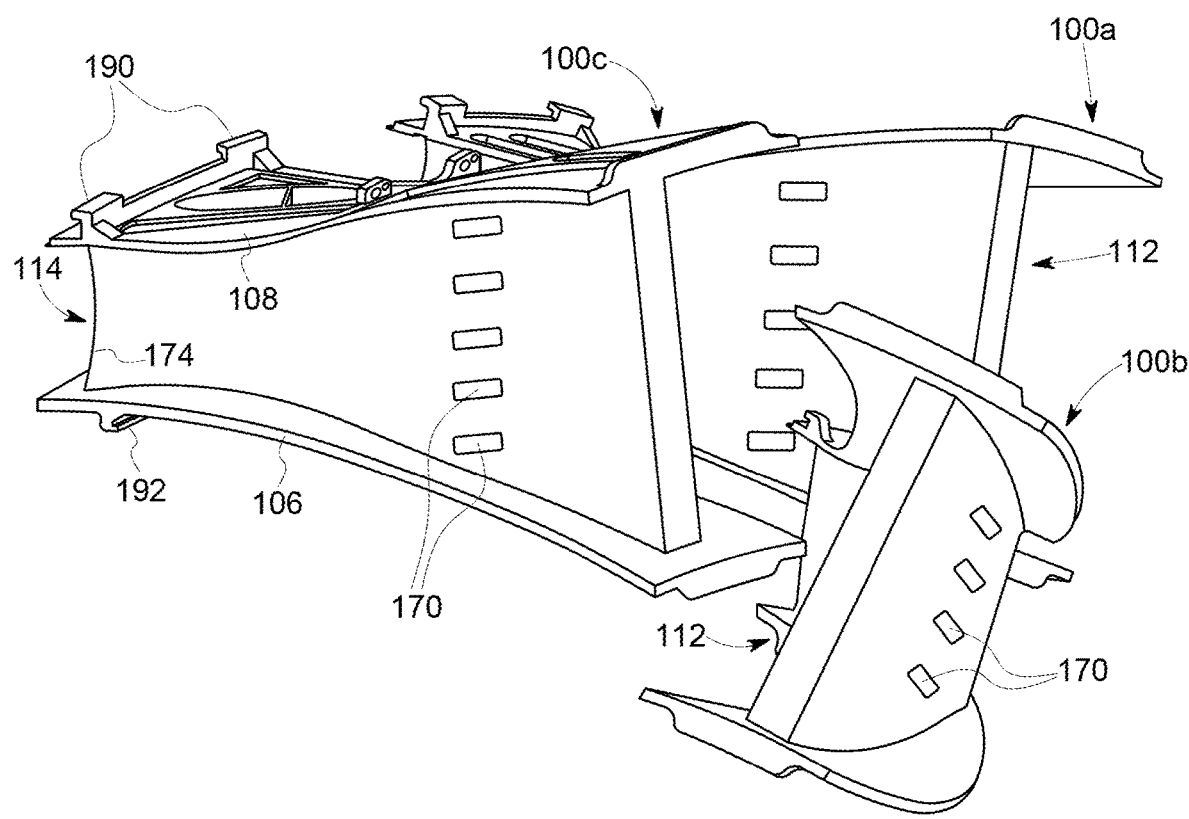
FIG. 21 is a perspective, forward-looking-aft view of the integrated combustor nozzles of FIG. 18, in which one of the integrated combustor nozzles is fully removed.

FIG. 21 provides a forward-looking-aft perspective view of the integrated combustor nozzle 100b when removed from its position between adjacent integrated combustor nozzles 100a, 100c. Because all the integrated combustor nozzles 100 have the same continuous circumferential curve on the inner liner segment 106 and the outer liner segment 108, any integrated combustor nozzle 100 may be removed in the same manner (i.e., in a generally axial direction following the shape of the continuous circumferential curve) by simply removing the inner liner seals 140 and the outer liner seals 160 on either side of the integrated combustor nozzle 100 to be removed.

The installation process for the integrated combustor nozzles 100 may be accomplished by installing two or more integrated combustor nozzles 100 in an axial direction for form a circumferential array (such as integrated combustor nozzles 100a, 100b, 100c) and then installing in an axial direction the inner liner seals 140 and the outer liner seals 160 into the respective recesses 135, 155 defined by the continuously curved sealing surfaces 130/134, 150/154. If desired, several of, or all, the integrated combustor nozzles 100 may be disposed in a partial or full circumferential array before installing the seals 140, 160. Thus, the time required for assembly of the segmented annular combustor 36 is significantly reduced.

As described above with reference to FIG. 3, conventional sealing arrangements employ several rigid seals that are positioned end-to-end within a curved seal channel between the liner segments of integrated combustor nozzles when a plurality of integrated combustor nozzles are assembled circumferentially adjacent to one another in a segmented annular combustor assembly. There are several disadvantages in using these straight seals, including a complex assembly process to ensure the seals do not fall out or become crushed and a greater leakage rate. In addition, these rigid seals cannot be removed easily without disassembling the segmented annular combustor by removing at least one integrated combustor nozzle adjacent the seals to be removed.

In contrast to those conventional arrangements, embodiments of the present disclosure provide simple and improved installation of flexible seals between the liner segments that help to define the annular combustor assembly. The adjacent liner segments are designed to define an opening at least at an open forward end of the seal slot for receiving and removing the flexible seal. This provides ease of installing and removing the seal from a curved seal channel, by pushing or pulling in an axial direction, without disassembling the combustor assembly. The use of flexible seals advantageously reduces (i) the number of rigid seals (i.e. number of pieces) inserted in the seal slot along the seal length and (ii) the amount of leakage around the seal.

Exemplary embodiments of the curved seal and methods of installing the same are described above in detail. The methods and seals described herein are not limited to the specific embodiments described herein, but rather, components of the methods and seals may be utilized independently and separately from other components described herein. For example, the methods and seals described herein may have other applications not limited to practice with integrated combustor nozzles for power-generating gas turbines, as described herein. Rather, the methods and seals described herein can be implemented and utilized in various other industries.

While the technical advancements have been described in terms of various specific embodiments, those skilled in the art will recognize that the technical advancements can be practiced with modification within the spirit and scope of the claims.

What is claimed is:

1. A flexible seal for sealing between two adjacent gas turbine components, the flexible seal comprising:
a forward end, an aft end axially separated from the forward end, and an intermediate portion between the forward end and the aft end, the intermediate portion defining a continuous curve in the circumferential direction, such that the aft end is circumferentially offset from the forward end; and a first set of plies and a second set of plies joined at one or more axial locations over the forward end and the intermediate portion to the second set of plies, an aft end of the first set of plies being separated from an aft end of the second set of plies to form a bi-furcated aft end of the seal; and wherein the seal has an axial length of between 2 inches and 50 inches.

2. The flexible seal of claim 1, wherein the intermediate portion defines one or more inflection points only in the radial direction, when the seal is installed between the two adjacent gas turbine components.

3. The flexible seal of claim 1, further comprising an anchor disposed at the forward end of the seal, wherein the anchor defines a through-hole or an indentation configured to facilitate removal of the seal.

4. A flexible seal for sealing between two adjacent gas turbine components, the seal comprising:
 a forward end, an aft end, and a plurality of plies joined together at one or more locations along an axial length of the seal, the axial length being between 2 inches and 50 inches;
 wherein the aft end is axially, radially, and circumferentially offset from the forward end;
 wherein a continuous circumferential curve is defined between the forward end and the aft end; and
 wherein the plurality of plies includes a first set of plies and a second set of plies; and wherein an aft end of the first set of plies is separated from an aft end of the second set of plies to form a bi-furcated aft end of the seal.

5. The flexible seal of claim 4, wherein the intermediate portion is between the forward end and the aft end, and wherein the intermediate portion of the seal defines the continuous circumferential curve.

6. The flexible seal of claim 5, wherein the intermediate portion of the seal defines one or more inflection points only in the radial direction, when the seal is installed between the two adjacent gas turbine components.

7. The flexible seal of claim 4, further comprising an anchor disposed at the forward end of the seal, wherein the anchor defines a through-hole or an indentation configured to facilitate removal of the seal.

8. The flexible seal of claim 4, wherein the seal has a width, the width varying along the axial length of the seal.

9. A flexible seal for sealing between two adjacent gas turbine components, the seal comprising:
 a forward end and an aft end axially separated from the forward end;
 an intermediate portion between the forward end and the aft end, the intermediate portion defining a continuous curve in the circumferential direction, such that the aft end is axially, radially, and circumferentially offset from the forward end,
 wherein the flexible seal has an axial length,
 wherein the flexible seal comprises a plurality of plies joined together at one or more locations along the axial length, wherein the plurality of plies includes a first set of plies and a second set of plies, the first set of plies being joined over the forward end and the intermediate portion to the second set of plies; and wherein an aft end of the first set of plies is separated from an aft end of the second set of plies to form a bi-furcated aft end of the flexible seal.

10. The flexible seal of claim 9, wherein the intermediate portion defines one or more inflection points only in the radial direction, when the seal is installed between the two adjacent gas turbine components.

11. The flexible seal of claim 9, wherein the axial length of the flexible seal is between 2 inches and 50 inches.

12. The flexible seal of claim 9, further comprising an anchor disposed at the forward end of the seal, wherein the anchor defines a through-hole or an indentation configured to facilitate removal of the seal.

13. The flexible seal of claim 9, wherein the flexible seal has a width, the width varying along the axial length of the seal.

* * * * *